US010140768B2

(12) United States Patent
Takahashi et al.

(10) Patent No.: US 10,140,768 B2
(45) Date of Patent: Nov. 27, 2018

(54) HEAD MOUNTED DISPLAY, METHOD OF CONTROLLING HEAD MOUNTED DISPLAY, AND COMPUTER PROGRAM

(71) Applicant: SEIKO EPSON CORPORATION, Tokyo (JP)

(72) Inventors: Tatsunori Takahashi, Shiojiri (JP); Masahide Takano, Matsumoto (JP); Kaoru Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 294 days.

(21) Appl. No.: 14/870,659

(22) Filed: Sep. 30, 2015

(65) Prior Publication Data

US 2016/0110921 A1 Apr. 21, 2016

(30) Foreign Application Priority Data

Oct. 17, 2014 (JP) .................................. 2014-212725
Oct. 17, 2014 (JP) .................................. 2014-212728

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS

2002/0044152 A1* 4/2002 Abbott, III .............. G06T 11/00
345/629
2010/0260385 A1* 10/2010 Chau ......................... G06T 7/20
382/107
(Continued)

FOREIGN PATENT DOCUMENTS

JP H05-324250 A 12/1993
JP H07-168852 A 7/1995
(Continued)

*Primary Examiner* — Said Broome
*Assistant Examiner* — Nurun N Flora
(74) *Attorney, Agent, or Firm* — Oliff PLC

(57) ABSTRACT

A head mounted display, includes an image display unit enabling the user to visually recognize the virtual image, and an augmented reality processing unit causing the image display unit to form the virtual image including a virtual object displayed additionally to a real object actually existing in the real world, in which the augmented reality processing unit causes the virtual image including the virtual object in a first display aspect to be formed, and then causes the virtual image including the virtual object in a second display aspect to be formed after a predetermined retention time period has elapsed, and in which a degree of the visibility hindrance of the virtual object in the second display aspect for the real object is lower than a degree of the visibility hindrance of the virtual object in the first display aspect for the real object.

21 Claims, 12 Drawing Sheets

(51) Int. Cl.
*G02B 27/01* (2006.01)
*G09G 3/00* (2006.01)

(52) U.S. Cl.
CPC ............ *G06F 3/011* (2013.01); *G09G 3/003* (2013.01); *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 2011/0158478 A1 | 6/2011 | Yamada et al. | |
| 2011/0260967 A1 | 10/2011 | Matsushima | |
| 2013/0271488 A1* | 10/2013 | Stirbu | G09G 5/14 |
| | | | 345/619 |
| 2014/0055491 A1 | 2/2014 | Malamud et al. | |
| 2014/0098126 A1* | 4/2014 | Fein | G06T 11/00 |
| | | | 345/633 |
| 2014/0098137 A1* | 4/2014 | Fein | G06T 11/60 |
| | | | 345/633 |
| 2014/0168266 A1 | 6/2014 | Kimura | |
| 2014/0198129 A1 | 7/2014 | Liu et al. | |
| 2014/0368532 A1* | 12/2014 | Keane | G02B 27/017 |
| | | | 345/619 |

FOREIGN PATENT DOCUMENTS

| | | |
|---|---|---|
| JP | 2005-038008 A | 2/2005 |
| JP | 2010-067083 A | 3/2010 |
| JP | 2010-164814 A | 7/2010 |
| JP | 2010-210822 A | 9/2010 |
| JP | 2012-163853 A | 8/2012 |
| JP | 2014-119786 A | 6/2014 |
| WO | 2014-035368 A1 | 3/2014 |
| WO | 2014/110437 A1 | 7/2014 |

* cited by examiner

US 10,140,768 B2

HEAD MOUNTED DISPLAY, METHOD OF CONTROLLING HEAD MOUNTED DISPLAY, AND COMPUTER PROGRAM

BACKGROUND

1. Technical Field

The present invention relates to a head mounted display.

2. Related Art

There is a technique called augmented reality in which information is presented additionally to a real object which actually exists in the real world, by using a computer. In the augmented reality, information which is displayed additionally to a real object is also referred to as a "virtual object". An augmented reality function is mounted in a head mounted display (hereinafter, also referred to as an "HMD").

The HMD captures an image of external scenery with a camera, and performs image recognition on an image through the capturing so as to generate or acquire a virtual object. In a non-transmissive HMD in which a visual field of a user is blocked in a state in which the user wears the HMD, the user visually recognizes a captured image and a virtual object which are superimposed on each other. In a transmissive HMD in which the visual field of the user is not blocked in a state in which the user wears the HMD, only the virtual object is visually recognized by the user. The user wearing the transmissive HMD views both a real object of the real world and the virtual object and can thus realistically experience the augmented reality. JP-A-2010-67083 discloses a technique for realizing the augmented reality in a transmissive HMD.

The above-described virtual object is frequently disposed so as to be superimposed on a real object or disposed around the real object. For this reason, there is a problem in that display of the virtual object in the non-transmissive/transmissive HMD may hinder a user from visually recognizing the real object. Such a problem is not taken into consideration in the techniques disclosed in JP-A-2010-67083 and JP-A-2005-38008. In addition, there is a problem in that, even in a case where it is considered that a virtual object is not required to be displayed, the virtual object is displayed, and this may hinder a user from visually recognizing the real object and may thus experience inconvenience.

For this reason, a head mounted display is desirable in which display of a virtual object does not hinder visual recognition of a real object.

SUMMARY

An advantage of some aspects of the invention is to solve at least a part of the problems described above, and the invention can be implemented as the following forms.

(1) An aspect of the invention provides a head mounted display which allows a user to visually recognize a virtual image. The head mounted display includes an image display unit that enables the user to visually recognize the virtual image; and an augmented reality processing unit that causes the image display unit to form the virtual image including a virtual object which is displayed additionally to a real object actually existing in the real world, in which the augmented reality processing unit causes the virtual image including the virtual object in a first display aspect to be formed, and then causes the virtual image including the virtual object in a second display aspect to be formed after a predetermined retention time period has elapsed, and in which a degree of the visibility hindrance of the virtual object in the second display aspect for the real object is lower than a degree of the visibility hindrance of the virtual object in the first display aspect for the real object.

According to the head mounted display of this aspect, the augmented reality processing unit causes the image display unit to form the virtual image including the virtual object in the first display aspect and then causes the image display unit to form the virtual image including the virtual object in the second display aspect, having a degree of the visibility hindrance lower than a degree of the visibility hindrance in the first display aspect after the retention time period has elapsed. In the above-described way, since a degree of the visibility hindrance of the virtual object occupying the displayed virtual image is automatically reduced after the retention time period has elapsed, it becomes easier for a user to visually recognize a real object which actually exists in the real world. As a result, it is possible to provide a head mounted display in which display of a virtual object is unlikely to hinder visual recognition of a real object or the background thereof.

(2) In the head mounted display of the aspect described above, the retention time period may have a variable length.

According to the head mounted display of this aspect, depending on various conditions, it is possible to change a retention time period for switching a display aspect from the first display aspect in which a degree of the visibility hindrance is high to the second display aspect in which a degree of the visibility hindrance is low, for example.

(3) The head mounted display of the aspect described above may further include a retention time acquisition unit that acquires the retention time period used in the augmented reality processing unit in the past, and the augmented reality processing unit may obtain a statistic of the acquired past retention time period, and may change the retention time period used in the present process on the basis of the obtained statistic.

According to the head mounted display of this aspect, the augmented reality processing unit can automatically change a retention time period used in the present process on the basis of a statistic of a retention time period (a time period taken for a degree of the visibility hindrance to be automatically reduced) used in the past process in the augmented reality processing unit, that is, a tendency of the retention time period used in the past process.

(4) In the head mounted display of the aspect described above, the augmented reality processing unit may obtain an information amount of the virtual object in the first display aspect, and may change the retention time period used in the present process on the basis of the obtained information amount.

According to the head mounted display of this aspect, the augmented reality processing unit can change a retention time period (a time period taken for a degree of the visibility hindrance to be automatically reduced) used in the present process on the basis of an information amount of the virtual object in the first display aspect in which a degree of the visibility hindrance is high. In the above-described way, for example, the augmented reality processing unit can make a retention time period in a case where an information amount of a virtual object in the first display aspect is large, in other words, it is estimated that the user requires much time to understand content of a virtual object longer than a retention time period in a case where an information amount is small, and thus it is possible to improve a user's convenience.

(5) In the head mounted display of the aspect described above, the augmented reality processing unit may change a method of obtaining the information amount depending on the kind of virtual object in the first display aspect.

According to the head mounted display of this aspect, the augmented reality processing unit can obtain an information amount of a virtual object in the first display aspect in a method suitable for the kind of virtual object, and thus it is possible to understand an information amount of the virtual object more accurately.

(6) The head mounted display of the aspect described above may further include a retention time acquisition unit that acquires a user's setting performed on the retention time period, and the augmented reality processing unit may change the retention time period used in the present process on the basis of the acquired user's setting.

According to the head mounted display of this aspect, the augmented reality processing unit can change the retention time period (a time period taken for a degree of the visibility hindrance to be automatically reduced) used in the present process on the basis of a user's preference.

(7) The head mounted display of the aspect described above may further include a retention time acquisition unit that acquires retention time information in which the retention time period used in the past in the augmented reality processing unit, an information amount of the virtual object in the first display aspect at that time, and identification information for identifying the user are correlated with each other, and the augmented reality processing unit may change the retention time period used in the present process on the basis of the acquired retention time information and the information amount of the virtual object in the first display aspect.

According to the head mounted display of this aspect, the augmented reality processing unit can obtain an information amount in which the user can perform recognition per unit time by using the retention time information. For this reason, the augmented reality processing unit can change the retention time period (a time period taken for a degree of the visibility hindrance to be automatically reduced) used in the present process on the basis of, for example, the obtained information amount (an information amount in which the user can perform recognition per unit time) and an information amount of a virtual object in the first display aspect. In the above-described way, the augmented reality processing unit can make a retention time period in a case where an information amount in which the user can perform recognition per unit time is small, in other words, it is estimated that the user requires much time to understand content of a virtual object longer than a retention time period in a case where an information amount is large. As a result, the augmented reality processing unit can change the retention time period according to an individual preference of the user, and thus it is possible to improve a user's convenience.

(8) In the head mounted display of the aspect described above, the virtual object in the second display aspect may include at least one of text, a graphic, a pattern, a symbol, and a combination thereof, suggesting content of the virtual object in the first display aspect.

According to the head mounted display of this aspect, it is possible to suggest content of a virtual object in the first display aspect by using a virtual object in the second display aspect in which a degree of the visibility hindrance is low.

(9) In the head mounted display of the aspect described above, the augmented reality processing unit may stop transition from the first display aspect to the second display aspect in a case where a first request is acquired from the user while waiting for the retention time period to elapse.

According to the head mounted display of this aspect, since the augmented reality processing unit can stop transition from the first display aspect to the second display aspect in response to the first request from the user, it is possible to improve a user's convenience.

(10) In the head mounted display of the aspect described above, the augmented reality processing unit may allow transition from the first display aspect to the second display aspect even before the retention time period has elapsed in a case where a second request is acquired from the user while waiting for the retention time period to elapse.

According to the head mounted display of this aspect, the augmented reality processing unit can force a display aspect of the augmented reality process to transition from the first display aspect to the second display aspect even before a retention time period has elapsed in response to the second request from the user, and thus it is possible to improve a user's convenience.

(11) The head mounted display of the aspect described above may further include a request acquisition unit that acquires a request realized by at least one of the hand, the foot, a sound and the head of the user, and a combination thereof, as the first request or the second request.

According to the head mounted display of this aspect, the user can realize the first request or the second request by using at least one of the hand, the foot, a sound and the head of the user, and a combination thereof.

(12) In the head mounted display of the aspect described above, the augmented reality processing unit may change transition from the first display aspect to the second display aspect in stages.

According to the head mounted display of this aspect, the augmented reality processing unit can change the transition from the first display aspect to the second display aspect in stages and thus it is possible to reduce a sense of discomfort felt by the user due to the transition in the display aspect.

(13) Another aspect of the invention provides a head mounted display which allows a user to visually recognize a virtual image and external scenery. The head mounted display includes an image display unit that enables the user to visually recognize the virtual image; and an augmented reality processing unit that causes the image display unit to form the virtual image including a virtual object which is displayed additionally to a real object actually existing in the real world, in which, in response to a continuous focusing operation on the real object during a predetermined reference time period, the augmented reality processing unit causes the virtual image including the virtual object in a first display aspect to be formed, the virtual object being related to the real object on which at least the focusing operation is performed.

According to the head mounted display of this aspect, the augmented reality processing unit causes the image display unit to form the virtual image including the virtual object in the first display aspect in relation to a real object on which at least a focusing operation is performed when the focusing operation is continuously performed for a predetermined reference time period. In the above-described way, since the virtual object is displayed according to a user's intention such as a continuous focusing operation, a user can maintain a state in which a real object which actually exists in the real world is easily visually recognized as long as the user does not continuously perform the focusing operation. As a result, it is possible to provide a head mounted display in which display of a virtual object is unlikely to hinder visual recognition of a real object or the background thereof.

(14) In the head mounted display of the aspect described above, in a case where the virtual image including the virtual object in a second display aspect is formed prior to formation of the virtual image including the virtual object in the first display aspect, in response to a continuous focusing operation on either in the virtual object in the second display aspect or the real object during the reference time period, the augmented reality processing unit may cause the virtual image including the virtual object in the first display aspect to be formed, the virtual object being related to the virtual object or the real object on which at least the focusing operation is performed. In addition, a degree of the visibility hindrance of the virtual object in the second display aspect for the real object may be lower than a degree of the visibility hindrance of the virtual object in the first display aspect for the real object.

According to the head mounted display of this aspect, after the image display unit forms the virtual image including the virtual object in the second display aspect, the augmented reality processing unit can cause the image display unit to form the virtual image including the virtual object in the first display aspect, having a larger degree of visibility hindrance than that in the second display aspect when the focusing operation is continuously performed on a virtual object in the second display aspect for a predetermined reference time period in addition to the real object. In the above-described way, since a display aspect of the virtual object transitions from the second display aspect to the first display aspect according to a user's intention such as a continuous focusing operation, and thus a degree of the visibility hindrance is reduced, the user can maintain a state in which a real object which actually exists in the real world is easily visually recognized as long as the user does not continuously perform the focusing operation. In other words, the user can control the degree of the visibility hindrance of a virtual object according to the user's intention. As a result, it is possible to provide a head mounted display in which display of a virtual object is unlikely to hinder visual recognition of a real object or the background thereof.

(15) The head mounted display of the aspect described above may further include a visual line acquisition unit that acquires a motion of a visual line of the user as the focusing operation.

According to the head mounted display of this aspect, the user can perform a focusing operation by using a motion of the visual line without moving the hand or the foot. For this reason, the user can easily perform a focusing operation even when performing work in which it is difficult for the user to freely use his or her hand.

(16) The head mounted display of the aspect described above may further include a motion acquisition unit that acquires a motion of the hand of the user as the focusing operation.

According to the head mounted display of this aspect, the user can easily perform a focusing operation by using a motion of the hand which is a familiar and normal action.

(17) In the head mounted display of the aspect described above, the reference time period may have a variable length.

According to the head mounted display of this aspect, it is possible to change a reference time period for switching a display aspect to the first display aspect, for example, depending on various conditions.

(18) The head mounted display of the aspect described above may further include a reference time acquisition unit that acquires the reference time period used in the augmented reality processing unit in the past, and the augmented reality processing unit may obtain a statistic of the acquired past reference time periods, and may change the reference time period used in the present process on the basis of the obtained statistic.

According to the head mounted display of this aspect, the augmented reality processing unit can automatically change a reference time period used in the present process on the basis of a statistic of a reference time period used in the past process in the augmented reality processing unit, that is, a tendency of the reference time period used in the past process.

(19) In the head mounted display of the aspect described above, the augmented reality processing unit may obtain an information amount of the virtual object in the first display aspect, and may change the reference time period used in the present process on the basis of the obtained information amount.

According to the head mounted display of this aspect, the augmented reality processing unit can change a reference time period used in the present process on the basis of an information amount of the virtual object in the first display aspect in which a degree of the visibility hindrance is high. In the above-described way, for example, the augmented reality processing unit can make a reference time period in a case where an information amount of a virtual object in the first display aspect is large, in other words, display of a virtual object in transition to the first display aspect is likely to hinder visual recognition of a real object longer than a reference time period in a case where an information amount is small, and thus it is possible to improve a user's convenience.

(20) In the head mounted display of the aspect described above, the augmented reality processing unit may change the method of obtaining the information amount depending on the kind of virtual object in the first display aspect.

According to the head mounted display of this aspect, the augmented reality processing unit can obtain an information amount of a virtual object in the first display aspect in a method suitable for the kind of virtual object, and thus it is possible to understand an information amount of the virtual object more accurately.

(21) The head mounted display of the aspect described above may further include a reference time acquisition unit that acquires a user's setting performed on the reference time period, and the augmented reality processing unit may change the reference time period used in the present process on the basis of the acquired user's setting.

According to the head mounted display of this aspect, the augmented reality processing unit can change a reference time period used in the present process on the basis of a user's preference.

(22) The head mounted display of the aspect described above may further include a reference time acquisition unit that acquires reference time information in which the reference time period used in the past in the augmented reality processing unit, an information amount of the virtual object in the first display aspect at that time, and identification information for identifying the user are correlated with each other, and the augmented reality processing unit may change the reference time period used in the present process on the basis of the acquired reference time information and the information amount of the virtual object in the first display aspect.

According to the head mounted display of the aspect described above, the augmented reality processing unit can obtain an information amount in which the user can focus per unit time by using the reference time information. For this reason, the augmented reality processing unit can change a reference time period used in the present process on the basis of, for example, the obtained information amount (an information amount in which the user can focus per unit time) and an information amount of a virtual object in the first display aspect. In the above-described way, the augmented reality processing unit can make a reference time period in a case where an information amount in which the user can focus per unit time is small, in other words, display of a virtual object in transition to the first display aspect is likely to hinder visual recognition of a real object longer than a reference time period in a case where an information amount is large. As a result, the augmented reality processing unit can change a reference time period according to an individual preference of the user, and thus it is possible to improve a user's convenience.

(23) In the head mounted display of the aspect described above, the virtual object in the second display aspect may include at least one of text, a graphic, a pattern, a symbol, and a combination thereof, suggesting content of the virtual object in the first display aspect.

According to the head mounted display of this aspect, it is possible to suggest content of a virtual object in the first display aspect by using a virtual object in the second display aspect in which a degree of the visibility hindrance is low.

(24) In the head mounted display of the aspect described above, the augmented reality processing unit may stop transition to the first display aspect in a case where a first request is acquired from the user while waiting for the reference time period to elapse.

According to the head mounted display of this aspect, since the augmented reality processing unit can stop transition to the first display aspect in response to the first request from the user, it is possible to improve a user's convenience.

(25) In the head mounted display of the aspect described above, the augmented reality processing unit may cause the virtual image including the virtual object in the first display aspect to be formed even before the reference time period has elapsed in a case where a second request is acquired from the user while waiting for the reference time period to elapse.

According to the head mounted display of this aspect, the augmented reality processing unit can cause the virtual object in the first display aspect to be displayed even before the reference time period has elapsed in response to the second request from the user, and thus it is possible to improve a user's convenience.

(26) The head mounted display of the aspect described above may further include a request acquisition unit that acquires a request realized by at least one of the hand, the foot, a sound and the head of the user, and a combination thereof, as the first request or the second request.

According to the head mounted display of this aspect, the user can realize the first request or the second request by using at least one of the hand, the foot, a sound and the head of the user, and a combination thereof.

(27) Still another aspect of the invention provides a head mounted display which allows a user to visually recognize a virtual image. The head mounted display includes an image display unit that enables the user to visually recognize the virtual image; and an augmented reality processing unit that causes the image display unit to form the virtual image including a virtual object which is displayed additionally to a real object actually existing in the real world, in which, in a case where a predetermined operation is not performed within a predetermined reference time period, the augmented reality processing unit causes the virtual image including the virtual object in a first display aspect to be formed, the virtual object being related to at least the real object.

According to the head mounted display of this aspect, in a case where a predetermined operation is not started by the user within a predetermined reference time period, the augmented reality processing unit causes the image display unit to form a virtual image including a virtual object in the first display aspect. In other words, in a case where the predetermined operation performed by the user is started within the reference time period, the augmented reality processing unit does not display the virtual object in the first display aspect. For this reason, for example, in a case where the user performs a predetermined operation (for example, certain work), it is possible to reduce a possibility that a virtual object in the first display aspect may be displayed and may shield visual fields of the user. As a result, it is possible to provide a head mounted display in which the display of a virtual object is unlikely to hinder visual recognition of a real object or the background thereof.

All of the plurality of constituent elements in the respective aspects of the invention described above are not essential, and some of the plurality of constituent elements may be changed, deleted, exchanged with other new constituent elements, and partially deleted from the limited content thereof, as appropriate, in order to solve some or all of the above-described problems or in order to achieve some or all of the effects described in the present specification. In addition, in order to solve some or all of the above-described problems or in order to achieve some or all of the effects described in the present specification, some or all of the technical features included in one aspect of the invention described above may be combined with some or all of the technical features included in another aspect of the invention described above, and as a result may be treated as an independent aspect of the invention.

For example, one aspect of the invention may be realized as a device which includes either or both of the two constituent elements including the image display unit and the augmented reality processing unit. In other words, this device may or may not include the image display unit. The device may or may not include the augmented reality processing unit. This device may be realized as, for example, a head mounted display, but may be realized as devices other than the head mounted display. Some or all of the above-described technical features of each aspect of the head mounted display are applicable to the device. For example, the device as one aspect of the invention is advantageous in that display of a virtual object is unlikely to hinder visual recognition of a real object. However, in the device, miniaturization of the device, improvement in convenience, achievement of low cost in manufacturing of the device, saving of resources, facilitation of manufacturing, and the like are desirable.

The invention may be realized in various aspects, and may be realized in aspects such as a head mounted display, a control method for the head mounted display, a system including the head mounted display, a computer program for realizing functions of the method, the display, and the system, and a storage medium for storing the computer program thereon.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Embodiment

A-1. Configuration of Head Mounted Display

Figure 1:
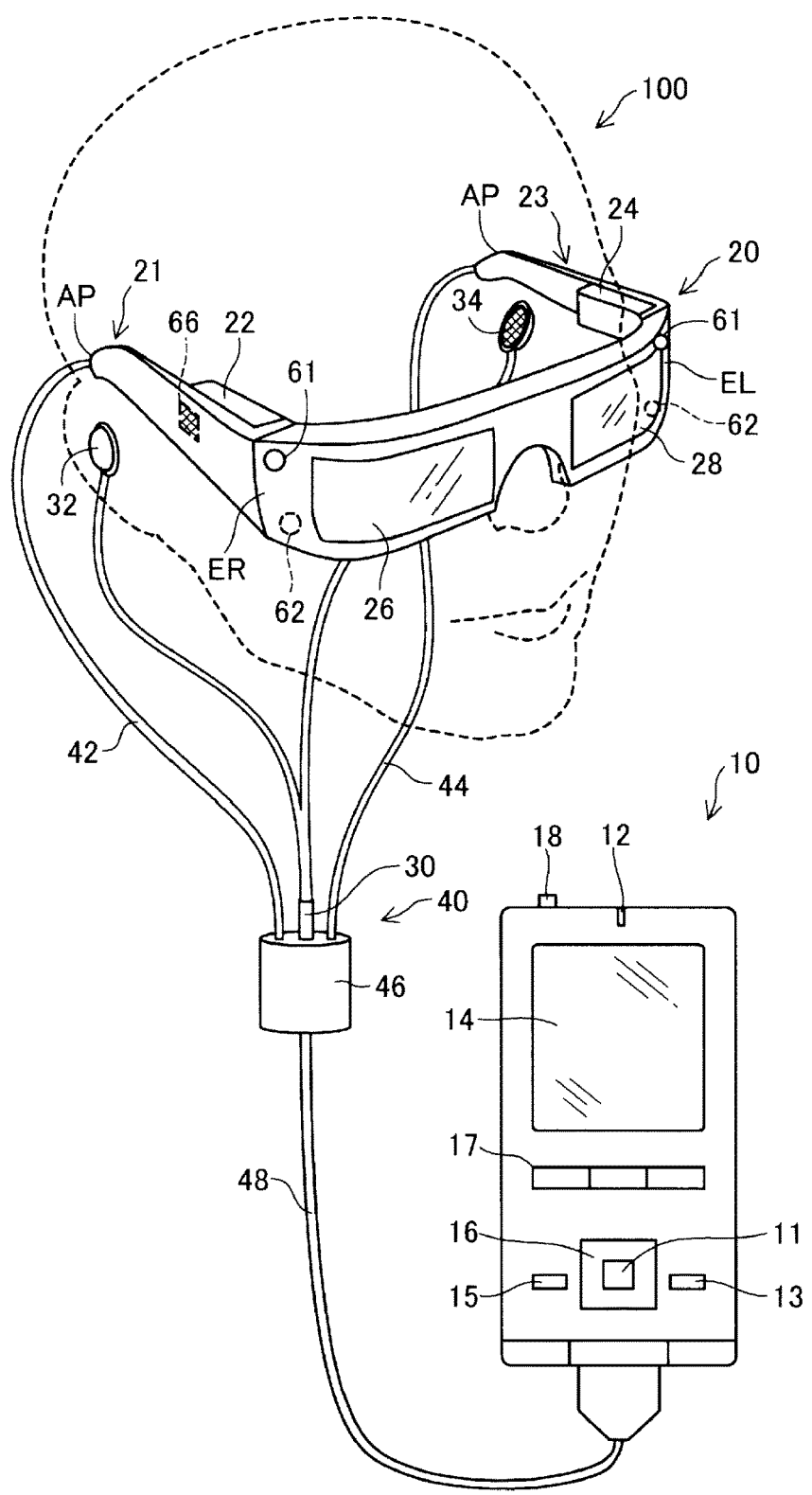
FIG. 1 is a diagram illustrating a schematic configuration of a head mounted display according to an embodiment of the invention.

FIG. 1 is a diagram illustrating a schematic configuration of a head mounted display according to an embodiment of the invention. A head mounted display 100 of the present embodiment is a display mounted on the head, and is hereinafter also simply referred to as an HMD 100. The HMD 100 is an optical transmission type head mounted display which allows a user to visually recognize a virtual image and also to directly visually recognize external scenery.

The HMD 100 of the present embodiment can perform an augmented reality process of adding information to a "real object" which actually exists in the real world by using a CPU of the HMD 100. Here, the object indicates any person, any plant and animal, any object (including artificial objects, natural objects, and the like), and the like. In the augmented reality process, information which is displayed additionally to a real object is referred to as a "virtual object". The HMD 100 of the present embodiment switches a display aspect of a virtual object which is additionally presented in the augmented reality process between a "first display aspect" and a "second display aspect", and can thus realize the augmented reality process so that display of a virtual object is unlikely to hinder visual recognition of a real object. Here, a virtual object in the first display aspect has a higher degree of the visibility hindrance than a virtual object in the second display aspect. In other words, the virtual object in the second display aspect has a lower degree of the visibility hindrance than the virtual object in the first display aspect.

The degree of the visibility hindrance indicates a "degree of hindering the visibility of a user" when the user visually recognizes the real world through a virtual image including a virtual object. The degree of the visibility hindrance may be replaced with a degree of visibility suppression.

In the present embodiment, the virtual object in the first display aspect and the virtual object in the second display aspect take some aspects listed below so that the degree of the visibility hindrance thereof can be improved or reduced.

(A) An area which is occupied by the virtual object in a virtual image is increased or decreased. Here, the "area occupied by the virtual object in a virtual image" indicates an area occupied by the virtual object in a range in which the virtual image can be shown in front of the eyes of a user. In this case, the virtual object in the second display aspect also includes an object by which an area occupied in a virtual image is "0".

(B) The transmittance of at least some virtual objects is increased or decreased. In this case, a virtual object in the second display aspect includes an aspect in which the transmittance of all virtual objects in the first display aspect is increased, an aspect in which only a shadow of a virtual object in the first display aspect is displayed (the transmittance of portions other than the shadow is increased), or an aspect in which only a contour of a virtual object in the first display aspect is displayed (the transmittance of portions other than the contour is increased).

(C) A virtual image including a virtual object is displayed for both eyes or a single eye. Here, the display for both eyes indicates that image light from left and right image light generation units are emitted toward both eyes of a user, and the display for a single eye indicates that image light from either of the left and right image light generation units is emitted toward a single eye of the user.

In the following example, a case will be exemplified and described in which the aspect A is employed as a method for improving or reducing degrees of the visibility hindrance of a virtual object in the first display aspect and a virtual object in the second display aspect. Details of the augmented reality process or details of each display aspect will be described later.

The HMD 100 includes an image display section 20 which enables a user to visually recognize a virtual image in a state of being mounted on the head of the user, and a control section 10 (a controller) which controls the image display section 20. In the following description, for convenience, a virtual image which is displayed by the HMD 100 and is visually recognized by the user is also referred to as a "displayed image". In addition, emitting image light on the basis of image data by the HMD 100 is also referred to as "displaying an image".

A-1-1. Configuration of Image Display Section

Figure 2:
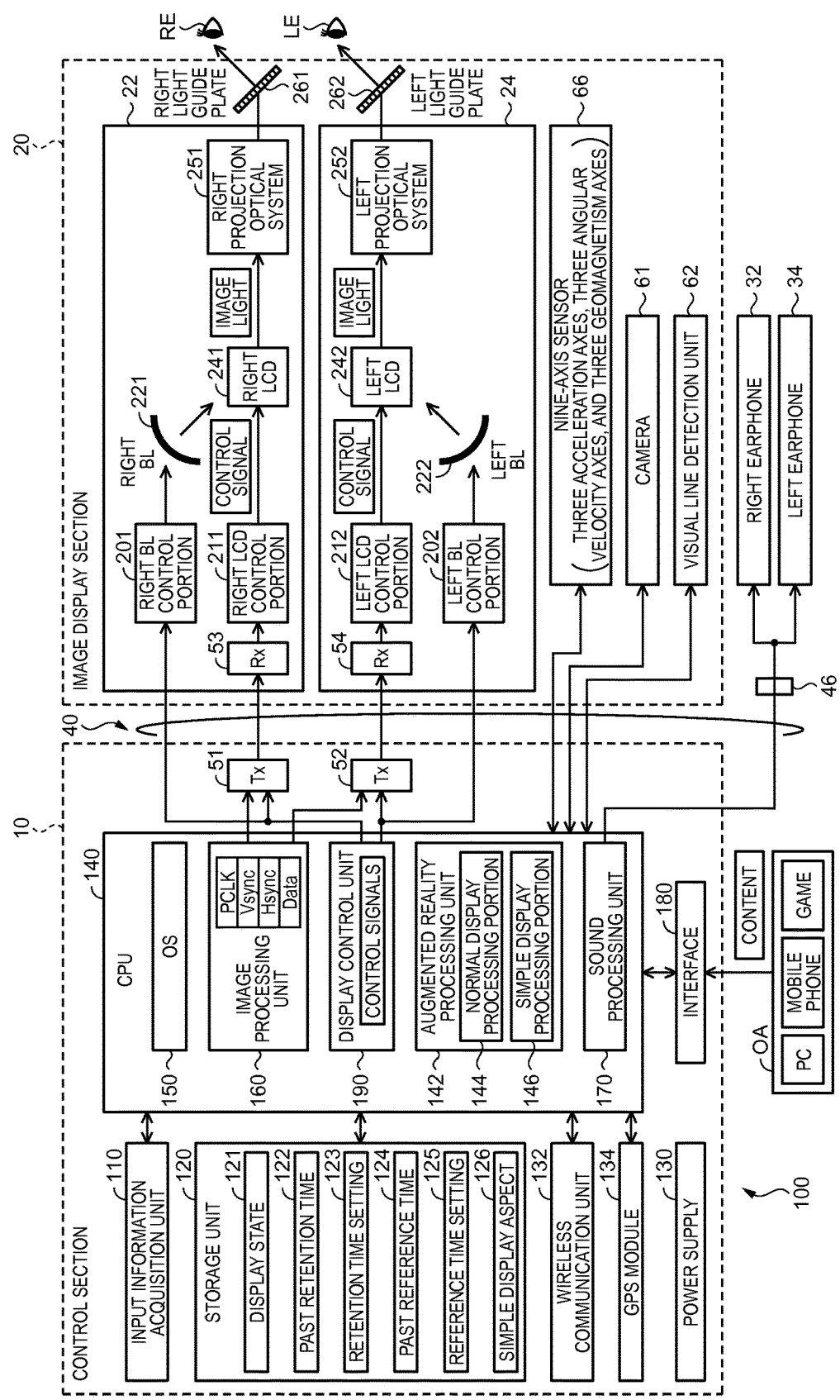
FIG. 2 is a functional block diagram illustrating a configuration of the head mounted display.

FIG. 2 is a block diagram illustrating a functional configuration of the HMD 100. The image display section 20 is a mounting body which is mounted on the head of the user, and has a spectacle shape in the present embodiment (FIG. 1). The image display section 20 includes a right holding unit 21, a right display driving unit 22, a left holding unit 23, a left display driving unit 24, a right optical image display unit 26, a left optical image display unit 28, cameras 61, visual line detection units 62, and a nine-axis sensor 66. Hereinafter, a description will be made of positional relationships between the respective units of the image display section 20 and functions thereof in a state in which the user wears the image display section 20.

As illustrated in FIG. 1, the right optical image display unit 26 and the left optical image display unit 28 are disposed so as to be respectively located in front of the right eye and the left eye of the user. One end of the right optical image display unit 26 and one end of the left optical image display unit 28 are connected to each other at the position corresponding to the glabella of the user. As illustrated in FIG. 2, the right optical image display unit 26 includes a right light guide plate 261 and a dimming plate (not illustrated). The right light guide plate 261 is made of a light-transmitting resin material or the like, and guides image light output from the right display driving unit 22 to the right eye RE of the user while reflecting the light along a predetermined light path. The dimming plate is a thin plate-shaped optical element, and is disposed so as to cover a surface side (an opposite side to the eye side of the user) of the image display section 20. The dimming plate protects the right light guide plate 261 so as to prevent the right light guide plate 261 from being damaged, contaminated, or the like. In addition, light transmittance of the dimming plate is adjusted so as to adjust an amount of external light entering the eyes of the user, thereby controlling an extent of visually recognizing a virtual image. Further, the dimming plate may be omitted.

The left optical image display unit 28 includes a left light guide plate 262 and a dimming plate (not illustrated). Details thereof are the same as those of the right optical image display unit 26. In addition, the right optical image display unit 26 and the left optical image display unit 28 are collectively simply referred to as "optical image display units". The optical image display units may employ any method as long as a virtual image is formed in front of the eyes of a user by using image light, and may be realized by using, for example, a diffraction grating or a transflective film.

As illustrated in FIG. 1, the right holding unit 21 is a member which is provided so as to extend over a position corresponding to the temporal region of the user from the other end part ER of the right optical image display unit 26. The left holding unit 23 is a member which is provided so as to extend over a position corresponding to the temporal region of the user from the other end part EL of the left optical image display unit 28. The right holding unit 21 and the left holding unit 23 hold the image display section 20 on the head of the user in the same manner as temples of spectacles. The right holding unit 21 and the left holding unit 23 are collectively simply referred to as "holding units".

As illustrated in FIG. 1, the right display driving unit 22 is disposed inside the right holding unit 21 (on a side opposing the head of the user). The left display driving unit 24 is disposed inside the left holding unit 23. As illustrated in FIG. 2, the right display driving unit 22 includes a reception portion (Rx) 53, a right backlight (BL) control portion 201 and a right backlight (BL) 221 which function as a light source, a right liquid crystal display (LCD) control portion 211 and a right LCD 241 which function as a display element, and a right projection optical system 251. The right backlight control portion 201, the right LCD control portion 211, the right backlight 221, and the right LCD 241 are also collectively referred to as an "image light generation unit". The reception portion 53 functions as a receiver which performs serial transmission between the control section 10 and the image display section 20. The right backlight control portion 201 drives the right backlight 221 on the basis of an input control signal. The right backlight 221 is a light emitting body such as a light emitting diode (LED) or an electroluminescence element (EL). The right LCD control portion 211 drives the right LCD 241 on the basis of a clock signal PCLK, a vertical synchronization signal VSync, a horizontal synchronization signal HSync, and right eye image data Data1, which are input via the reception portion 53. The right LCD 241 is a transmissive liquid crystal panel in which a plurality of pixels are arranged in a matrix. The right projection optical system 251 is constituted by a collimator lens which converts image light emitted from the right LCD 241 into parallel beams of light flux.

The left display driving unit 24 includes a reception portion (Rx) 54, a left backlight (BL) control portion 202 and a left backlight (BL) 222 which function as a light source, a left LCD control portion 212 and a left LCD 242 which function as a display element, and a left projection optical system 252. Details thereof are the same as those of the right display driving unit 22. In addition, the right display driving unit 22 and the left display driving unit 24 are collectively simply referred to as "display driving units".

As illustrated in FIG. 1, the cameras 61 are stereo cameras which are respectively disposed at positions corresponding to the upper sides of the outer corners of the left and right eyes of the user. The left and right cameras 61 respectively capture images of external scenery in a surface side direction of the image display section 20, that is, in a visual line direction of the user in a state in which the HMD 100 is mounted, and acquire two images corresponding to left and right external scenery images. The cameras 61 are visible light cameras, and the external scenery images acquired by the cameras 61 are images showing a shape of an object on the basis of visual light radiated from the object. Image recognition is performed on the two external scenery images obtained by the cameras 61, and thus the CPU 140 of the control section 10 can detect and acquire motions of the hands of the user. In order to improve accuracy of the image recognition, the CPU 140 may use a fingertip of the user, a ring worn on the user's hand, or a specific tool held by the user, or the like, as a mark for detection. In this case, the cameras 61 and the CPU 140 function as a "motion acquisition unit" which detects a motion of the user's hand. The cameras 61 in the present embodiment are stereo cameras, but a monocular camera may be used.

As illustrated in FIG. 1, the visual line detection units 62 are respectively disposed at positions corresponding to lower sides of the tails of the left and right eyes of the user. Each of the left and right visual line detection units 62 includes an infrared light emitting portion and an infrared light receiving portion (not illustrated). The right visual line detection unit 62 receives infrared light which is emitted from the infrared light emitting portion and is reflected after contacting the right eye of the user. The CPU 140 of the control section 10 acquires a motion of the visual line of the right eye of the user on the basis of the intensity of the infrared light received by the right visual line detection unit 62. Similarly, the left visual line detection unit 62 receives infrared light which is emitted from the infrared light emitting portion and is reflected after contacting the left eye of the user. The CPU 140 acquires a motion of the visual line of the left eye of the user on the basis of the intensity of the infrared light received by the left visual line detection unit 62. The reflectance of the infrared light differs in a case where the infrared light contacts the iris, in a case where the infrared light contacts the eyelid, and in a case where the infrared light contacts the white of the eye. Specifically, the reflectance of the infrared light is the lowest value in a case where the infrared light contacts the iris, and increases in the order of the eyelid and the white of the eye. For this reason, the CPU 140 can acquire motions of the visual lines of the user on the basis of the intensity of the infrared light received by the visual line detection units 62. In this case, the visual line detection units 62 and the CPU 140 function as a "visual line acquisition unit" which acquires motions of visual lines of the user. In addition, the visual line detection units 62 of the present embodiment are respectively provided on the left and right sides, but may be provided on either the left or right sides.

As illustrated in FIG. 1, the nine-axis sensor 66 is disposed at a position corresponding to the right temple of the user. The nine-axis sensor 66 is a motion sensor which detects acceleration (in three axes), angular velocity (in three axes), and geomagnetism (in three axes). The nine-axis sensor 66 is provided in the image display section 20 and can thus detect and acquire a motion of the head of the user when the image display section 20 is mounted on the head. Here, the motion of the head includes velocity, acceleration, angular velocity, a direction, and a change in the direction of the head.

As illustrated in FIG. 1, the image display section 20 includes a coupling unit 40 which couples the image display section 20 to the control section 10. The coupling unit 40 has a main body cord 48 connected to the control section 10, a right cord 42 and a left cord 44 into which the main body cord 48 branches, and a connection member 46 provided at the branching point. The right cord 42 is coupled to the right display driving unit 22, and the left cord 44 is coupled to the left display driving unit 24. The connection member 46 is provided with a jack for connection to an earphone plug 30. A right earphone 32 and a left earphone 34 extend from the earphone plug 30. A connector (not illustrated) is provided at an end of the main body cord 48 on an opposite side to the connection member 46. The connector is fitted to and unfitted from a connector (not illustrated) provided in the control section 10, and thus connection and disconnection between the control section 10 and the image display section 20 are realized. The image display section 20 and the control section 10 perform transmission of various signals via the coupling unit 40. The right cord 42, the left cord 44, and the main body cord 48 may employ, for example, a metal cable or an optical fiber.

A-1-2. Configuration of Control Section

The control section 10 is a device which controls the HMD 100. As illustrated in FIG. 1, the control section 10 includes a determination key 11, a lighting unit 12, a display change key 13, a track pad 14, a luminance change key 15, a direction key 16, a menu key 17, and a power switch 18. The determination key 11 detects a pressing operation and outputs a signal for determining content which is operated in the control section 10. The lighting unit 12 is implemented by, for example, an LED, and performs a notification of an operation state (for example, On and Off of a power supply) of the HMD 100 by using its light emitting state. The display change key 13 detects a pressing operation and outputs a signal for changing a moving content image display mode between 3D and 2D. The track pad 14 detects an operation of the finger of the user on an operation surface of the track pad 14 and outputs a signal corresponding to detected content. As the track pad 14, various types such as an electrostatic type, a pressure detection type, and an optical type may be employed. The luminance change key 15 detects a pressing operation and outputs a signal for changing luminance of the image display section 20. The direction key 16 detects a pressing operation on a key corresponding to upper, lower, left, and right directions, and outputs a signal corresponding to detected content. The power switch 18 detects a sliding operation of the switch, and changes a power supply state of the HMD 100.

As illustrated in FIG. 2, the control section 10 includes an input information acquisition unit 110, a storage unit 120, a power supply 130, a wireless communication unit 132, a GPS module 134, the CPU 140, an interface 180, and the transmission units (Tx) 51 and 52, which are coupled to each other via a bus (not illustrated).

The input information acquisition unit 110 acquires a signal based on an input operation which is performed with the determination key 11, the display change key 13, the track pad 14, the luminance change key 15, the direction key 16, the menu key 17, and the power switch 18. The input information acquisition unit 110 may acquire an operation input by using various methods other than the above description. For example, an operation input may be acquired by using a foot switch (a switch operated by the leg of the user). If an operation input can be acquired by using the foot switch, the input information acquisition unit 110 can acquire an operation input from a user even when performing work in which it is difficult for the user to freely use his or her hands.

The storage unit 120 is constituted by a ROM, a RAM, a DRAM, a hard disk, and the like. The storage unit 120 stores various computer programs including an operating system (OS). The storage unit 120 stores in advance a display state 121, a past retention time 122, a retention time setting 123, a past reference time 124, a reference time setting 125, and a simple display aspect 126.

The display state 121 stores information indicating whether a display aspect of a virtual object in the present augmented reality process is the first display aspect or the second display aspect. The display state 121 may store the type of display aspect, for example, by using a flag, or by using numbers or text.

The past retention time 122 stores history of a retention time period used in the past augmented reality process. Here, the "retention time period" indicates a time period required for a display aspect of a virtual object to transition from the first display aspect to the second display aspect in the augmented reality process. The past retention time 122 may store a retention time period used in the past augmented reality process, an information amount of a virtual object in the first display aspect at that time, and an identifier of a user at that time in correlation with each other.

The retention time setting 123 stores a retention time period which is set by the user. As the content of the retention time setting 123, any initial value may be stored during manufacturing of the HMD 100. The content of the retention time setting 123 may be changed as appropriate by the user.

The past reference time 124 stores history of a reference time period used in the past augmented reality process. Here, the "reference time period" indicates a time period required for a display aspect of a virtual object to transition from the second display aspect to the first display aspect in the augmented reality process. The past reference time 124 may store a reference time period used in the past augmented reality process, an information amount of a virtual object in the first display aspect at that time, and an identifier of the user at that time in correlation with each other.

The reference time setting 125 stores a reference time period which is set by the user. As the content of the reference time setting 125, any initial value may be stored during manufacturing of the HMD 100. The content of the reference time setting 125 may be changed as appropriate by the user.

The simple display aspect 126 stores information indicating a specific display aspect which is employed in the second display aspect of a virtual object. In the present embodiment, a specific display aspect employed in the second display aspect includes (aspect 1) end part icon display, (aspect 2) vicinity icon display, (aspect 3) emphasis display, and (aspect 4) non-display. Each aspect will be described later in detail. The simple display aspect 126 stores information indicating any one of the above-described aspects 1 to 4. The simple display aspect 126 may store a specific display aspect, for example, by using a flag, or by using numbers or text.

The power supply 130 supplies power to each unit of the HMD 100. For example, a secondary battery may be used as the power supply 130.

The wireless communication unit 132 performs wireless communication with other apparatuses in accordance with a predetermined wireless communication standard. The predetermined wireless communication standard refers to near field wireless communication exemplified in infrared communication or Bluetooth (registered trademark) communication, or a wireless LAN exemplified in IEEE802.11.

The GPS module 134 receives a signal from a GPS satellite so as to detect the present position of the user of the HMD 100, and generates present position information indicating the present position of the user. The present position information may be realized by, for example, coordinates indicating latitude and longitude.

The CPU 140 reads and executes the computer programs stored in the storage unit 120 so as to function as an augmented reality processing unit 142, an OS 150, an image processing unit 160, a sound processing unit 170, and a display control unit 190.

The augmented reality processing unit 142 performs the augmented reality process. The augmented reality processing unit 142 includes a normal display processing portion 144 and a simple display processing portion 146. The normal display processing portion 144 performs a normal display process which will be described later so as to cause the image display section 20 to form a virtual image including a virtual object in the first display aspect. The simple display processing portion 146 performs a simple display process which will be described later so as to cause the image display section 20 to form a virtual image including a virtual object in the second display aspect. The augmented reality processing unit 142 performs switching between the normal display process performed by the normal display processing portion 144 and the simple display process performed by the simple display processing portion 146 on the basis of a transition condition which will be described later. In other words, in the present embodiment, the normal display process and the simple display process are performed as sub-routines of the augmented reality process.

The image processing unit 160 generates signals on the basis of content (video) which is input via the interface 180 or the wireless communication unit 132. For example, in a case where the content is in a digital format, the image processing unit 160 generates a clock signal PCLK and image data Data. In addition, in the case of the digital format, since the clock signal PCLK is output in synchronization with an image signal, generation of a vertical synchronization signal VSync and a horizontal synchronization signal HSync and A/D conversion of an analog image signal are not necessary. The image processing unit 160 transmits, to the image display section 20, the generated clock signal PCLK, vertical synchronization signal VSync and horizontal synchronization signal HSync, and the image data Data stored in the DRAM of the storage unit 120 via the transmission units 51 and 52. The image data Data which is transmitted via the transmission unit 51 is also referred to as "right eye image data Data1", and the image data Data which is transmitted via the transmission unit 52 is also referred to as "left eye image data Data2". The image processing unit 160 may perform, on the image data Data stored in the storage unit 120, image processes such as a resolution conversion process, various color tone correction processes such as adjustment of luminance and color saturation, and a keystone correction process.

The display control unit 190 generates control signals for control of the right display driving unit 22 and the left display driving unit 24. Specifically, the display control unit 190 individually controls the right and left LCD control portions 211 and 212 to turn on and off driving of the right and left LCDs 241 and 242, and controls the right and left backlight control portions 201 and 202 to turn on and off driving of the right and left backlights 221 and 222, by using the control signals, so as to control each of the right display driving unit 22 and the left display driving unit 24 to generate and emit image light. The display control unit 190 transmits the control signals to the image display section 20 via the transmission units 51 and 52.

The sound processing unit 170 acquires an audio signal included in the content so as to amplify the acquired audio signal, and supplies the amplified audio signal to a speaker (not illustrated) of the right earphone 32 and a speaker (not illustrated) of the left earphone 34.

The interface 180 performs communication with external apparatuses OA in accordance with a predetermined wired communication standard. The predetermined wired communication standard refers to, for example, a micro-universal serial bus (MicroUSB), a USB, High Definition Multimedia Interface (HMDI; registered trademark), a digital visual interface (DVI), a video graphic array (VGA), a composite, Recommended Standard 232C (RS-232C), or a wired LAN exemplified in IEEE802.3. As the external apparatuses OA, for example, a personal computer PC, a portable telephone terminal, and a gaming terminal may be used.

Figure 3A:
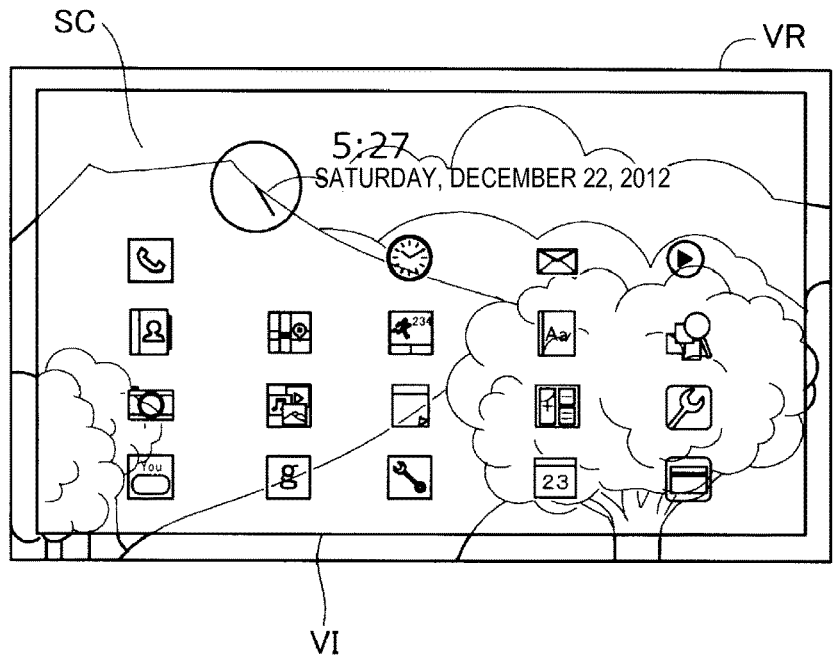
FIGS. 3A and 3B are diagrams illustrating an example of a virtual image which is visually recognized by a user.
Figure 3B:
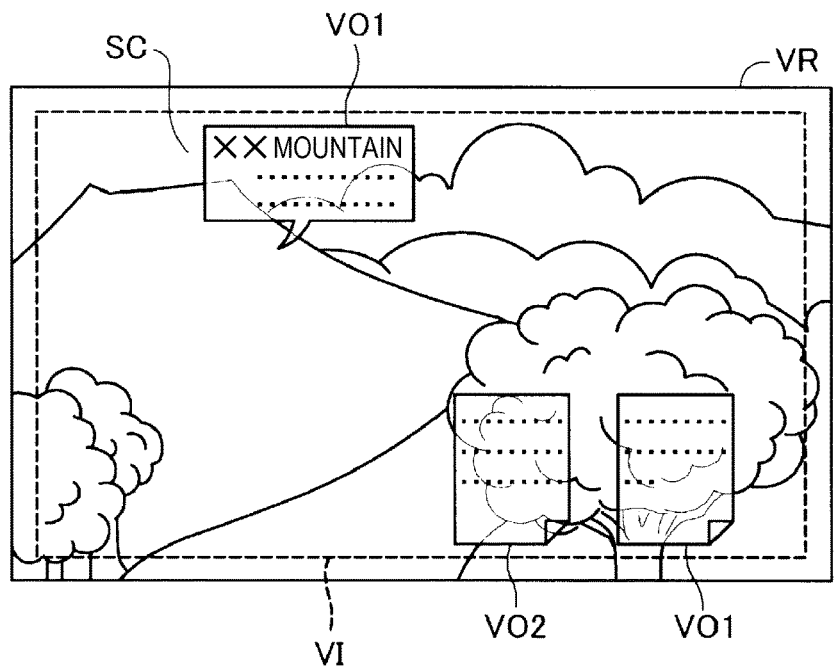

FIGS. 3A and 3B are diagrams illustrating examples of a virtual image which is visually recognized by the user. FIG. 3A exemplifies a visual field VR of the user in a case where the augmented reality process is not performed. In the above-described way, image light guided to both eyes of the user of the HMD 100 forms an image on the retinae of the user, and thus the user visually recognizes a virtual image VI. In the example of FIG. 3A, the virtual image VI is a standby screen of the OS 150 of the HMD 100. The user visually recognizes external scenery SC through the right optical image display unit 26 and the left optical image display unit 28. As mentioned above, the user of the HMD 100 of the present embodiment can view the virtual image VI and the external scenery SC on the background of the virtual image VI in a portion of the visual field VR where the virtual image VI is displayed. In a portion of the visual field VR where the virtual image VI is not displayed, the user can directly view the external scenery SC through the optical image display units.

FIG. 3B exemplifies the visual field VR of the user in a case where the augmented reality process is performed. The user visually recognizes a virtual image VI including virtual objects VO1 to VO3 through execution of the augmented reality process to be described later. The virtual object VO1 is balloon-shaped information which is displayed around a mountain (real object) of the real world in the external scenery SC. The virtual objects VO2 and VO3 are notebook-shaped information which is displayed so as to be superimposed on a tree (real object) of the real world in the external scenery SC. As mentioned above, the user views both of the virtual objects VO1 to VO3 included in the virtual image VI and the real objects in the external scenery SC which is seen through the virtual image VI on the background of the virtual image VI, and can thus realistically experience the augmented reality.

A-2. Augmented Reality Process

The augmented reality process is a process for presenting information (virtual object) additionally to a real object which actually exists in the real world. The augmented reality process is started when the augmented reality processing unit 142 receives an instruction for starting the augmented reality process from the OS 150 or another application, or the augmented reality processing unit 142 receives information indicating that power supply of the HMD 100 enters a turned-on state.

A-2-1. State Transition of Augmented Reality Process

Figure 4:
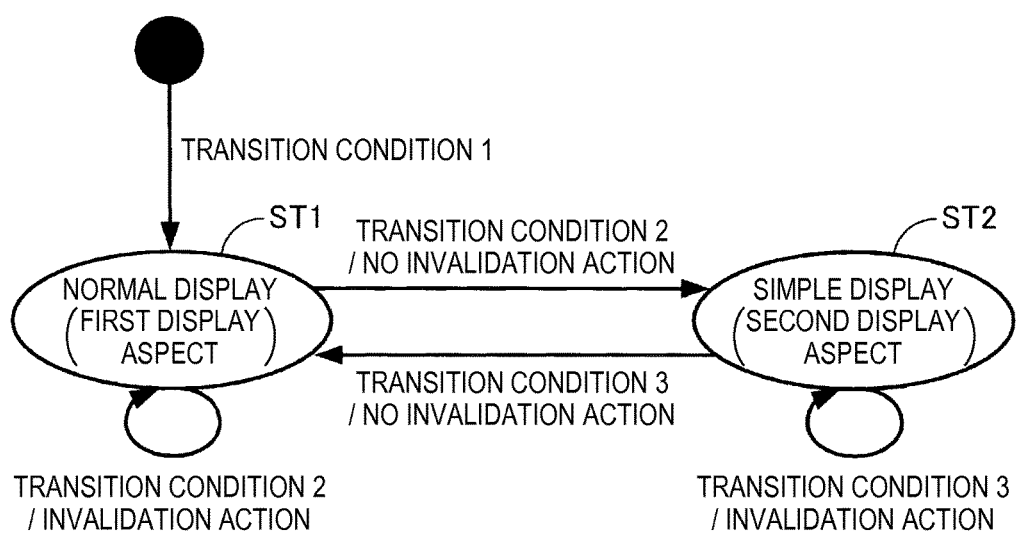
FIG. 4 is a diagram illustrating state transition of an augmented reality process.

FIG. 4 is a diagram illustrating state transition of the augmented reality process. The augmented reality process of the present embodiment can take a normal display state ST1 and a simple display state ST2. In the normal display state ST1, the augmented reality processing unit 142 causes the normal display processing portion 144 to perform a normal display process. As a result, a virtual image including a virtual object in the first display aspect is formed in the image display section 20. On the other hand, in the simple display state ST2, the augmented reality processing unit 142 causes the simple display processing portion 146 to perform a simple display process. As a result, a virtual image including a virtual object in the second display aspect is formed in the image display section 20.

After the augmented reality process is started, the augmented reality processing unit 142 monitors establishment of a transition condition 1. The transition condition 1 is a condition for causing a state of the augmented reality process to transition from a state after the starting to the normal display state ST1, that is, a condition for displaying a virtual object in the first display aspect. The augmented reality processing unit 142 may use a plurality of conditions as the transition condition 1, and details of the transition condition 1 will be described later.

In the normal display state ST1, the augmented reality processing unit 142 monitors establishment of a transition condition 2 and an invalidation action. The transition condition 2 is a condition for causing a state of the augmented reality process to transition from the normal display state ST1 to the simple display state ST2, that is, a condition for displaying a virtual object in the second display aspect. The augmented reality processing unit 142 may use a plurality of conditions as the transition condition 2, and details of the transition condition 2 will be described later.

The invalidation action is a predetermined operation performed by the user in order to cancel the state transition of the augmented reality process. In the present embodiment, a "hand waving operation" is employed as the invalidation action. The augmented reality processing unit 142 determines whether or not a motion of the user's hand acquired by the motion detection unit (the cameras 61 and the augmented reality processing unit 142 of the CPU 140) matches a pattern of a hand waving operation stored in advance. If the motion matches the pattern, the augmented reality processing unit 142 determines that the invalidation action has been performed, and if the motion does not match the pattern, the augmented reality processing unit 142 determines that the invalidation action has not been performed. In this case, the augmented reality processing unit 142 functions as a "request acquisition unit", and the invalidation action functions as a "first request".

As the invalidation action, other operations performed by using at least one of the hand, the foot, a sound and the head of the user, and a combination thereof may be employed. As the invalidation action, for example, an operation for forming the hand in a predetermined shape, an operation of inputting cancellation to the control section 10, and an operation of inputting cancellation with voice using a microphone may be employed.

In a case where the transition condition 2 is established and the invalidation action is not detected in the normal display state ST1, the augmented reality processing unit 142 causes a state of the augmented reality process to transition from the normal display state ST1 to the simple display state ST2. On the other hand, in a case where the transition condition 2 is established and the invalidation action is detected in the normal display state ST1, the augmented reality processing unit 142 maintains a state of the augmented reality process to be the normal display state ST1.

In the above-described manner, the augmented reality processing unit 142 can stop the transition from the first display aspect to the second display aspect, that is, the transition from the normal display state ST1 to the simple display state ST2 in response to the first request (invalidation action) from the user, and thus it is possible to improve a user's convenience. In addition, the augmented reality processing unit 142 which functions as a request acquisition unit can acquire a request from the user, performed by using at least one of the hand, the foot, a sound and the head of the user, and a combination thereof, as the first request.

In the simple display state ST2, the augmented reality processing unit 142 monitors establishment of a transition condition 3 and an invalidation action. The transition condition 3 is a condition for causing a state of the augmented reality process to transition from the simple display state ST2 to the normal display state ST1, that is, a condition for displaying a virtual object in the first display aspect. The augmented reality processing unit 142 may use a plurality of conditions as the transition condition 3, and details of the transition condition 3 will be described later. The invalidation action is the same as the invalidation action in the normal display state ST1.

In a case where the transition condition 3 is established and the invalidation action is not detected in the simple display state ST2, the augmented reality processing unit 142 causes a state of the augmented reality process to transition from simple display state ST2 to the normal display state ST1. On the other hand, in a case where the transition condition 3 is established and the invalidation action is detected in the simple display state ST2, the augmented reality processing unit 142 maintains a state of the augmented reality process to be the simple display state ST2.

In the above-described manner, the augmented reality processing unit 142 can stop the transition from the second display aspect to the first display aspect, that is, the transition from the simple display state ST2 to the normal display state ST1 in response to a request (invalidation action) from the user, and thus it is possible to improve a user's convenience. In addition, the augmented reality processing unit 142 which functions as a request acquisition unit can acquire a request from the user, performed by using at least one of the hand, the foot, a sound and the head of the user, and a combination thereof, and can stop the transition from the second display aspect to the first display aspect in the augmented reality processing unit 142.

A-2-2. Normal Display Process

Figure 5:
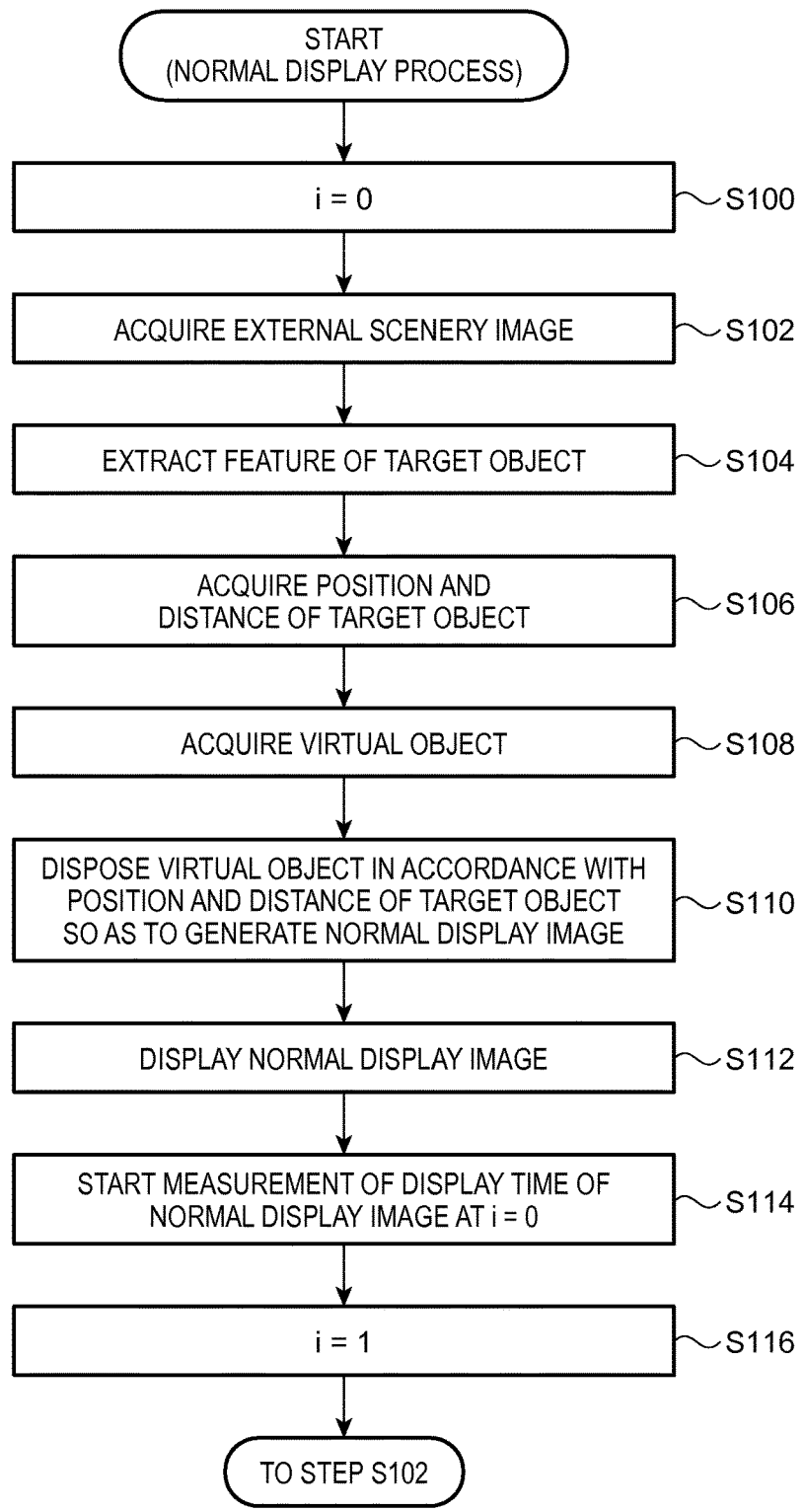
FIG. 5 is a flowchart illustrating procedures of a normal display process.

FIG. 5 is a flowchart illustrating procedures of the normal display process. The normal display process is a process for causing the image display section 20 to form a virtual image showing a virtual object in the first display aspect. The normal display process is started on the basis of an instruction from the augmented reality processing unit 142 and is performed by the normal display processing portion 144 in the normal display state ST1 (FIG. 4).

In step S100, the normal display processing portion 144 sets "0" to a variable i used in the process. In step S102, the normal display processing portion 144 causes the cameras 61 to acquire an external scenery image.

In step S104, the normal display processing portion 144 extracts a feature of a target object from the acquired external scenery image. Here, the "target object" indicates a "real object entering the visual field of the user" or a "real object which is a focusing operation target" when the transition condition 1 or the transition condition 3 is established among a plurality of real objects included in the external scenery image. The "focusing operation" indicates an operation in which the user focuses on a specific single point. The focusing operation may be specified by using a visual line of the user acquired by the visual line acquisition unit (FIG. 2) or a motion of the user's hand acquired by the motion detection unit (FIG. 2). A method of acquiring the focusing operation will be described later.

Specifically, in step S104, the normal display processing portion 144 extracts a feature of the target object included in the acquired external scenery image by using an image recognition method such as a1 and a2 exemplified below. The method a1 and the method a2 may be combined with each other.

(a1) An edge (feature part) of the target object is detected.

(a2) A marker (feature part) which is added to the target object in advance is detected. As a marker added to an object, various types of markers may be used, and, for example, a tape, a seal, Magic Marker (registered trademark), a laser marker, and Magic Tape (registered trademark) may be used. The number of markers added to an object is arbitrary.

In step S106, the augmented reality processing unit 142 acquires a position of the target object within the visual line of the user of the HMD 100 and a distance between the HMD 100 and the target object. Specifically, the augmented reality processing unit 142 sets a position of the feature part extracted in step S104 as a position of the target object within the visual line. The augmented reality processing unit 142 specifies the kind of target object and a size occupied by the target object in the entire external scenery image on the basis of the feature extracted in step S104. The augmented reality processing unit 142 estimates to what extent the target object is present at a position far from the HMD 100 (distance between the target object and the HMD 100) on the basis of the specified object and size. In a case where the HMD 100 includes a depth sensor or a distance measuring sensor, in step S106, the augmented reality processing unit 142 may acquire a distance between the HMD 100 and the target object by using a measured value from the sensor. Therefore, the augmented reality processing unit 142 can acquire a more accurate distance.

In step S108, the augmented reality processing unit 142 acquires one or a plurality of virtual objects corresponding to the target object. The augmented reality processing unit 142 may acquire a virtual object from a database (not illustrated) of the HMD 100, and may acquire a virtual object from a database (not illustrated) of another apparatus (a server or the like) connected to the HMD 100 via a network.

In step S110, the augmented reality processing unit 142 disposes the virtual object in accordance with the position and the distance of the target object so as to generate a normal display image. Specifically, the augmented reality processing unit 142 processes the virtual object (text or an image) acquired in step S108 so as to have a size corresponding to the distance of the target object acquired in step S106 and disposes the virtual object at a position corresponding to the position of the target object acquired in step S106. The augmented reality processing unit 142 disposes black data in a region in which the virtual object is not disposed in the normal display image, in order to improve the visibility of the external scenery SC when an image is displayed.

Figure 6:
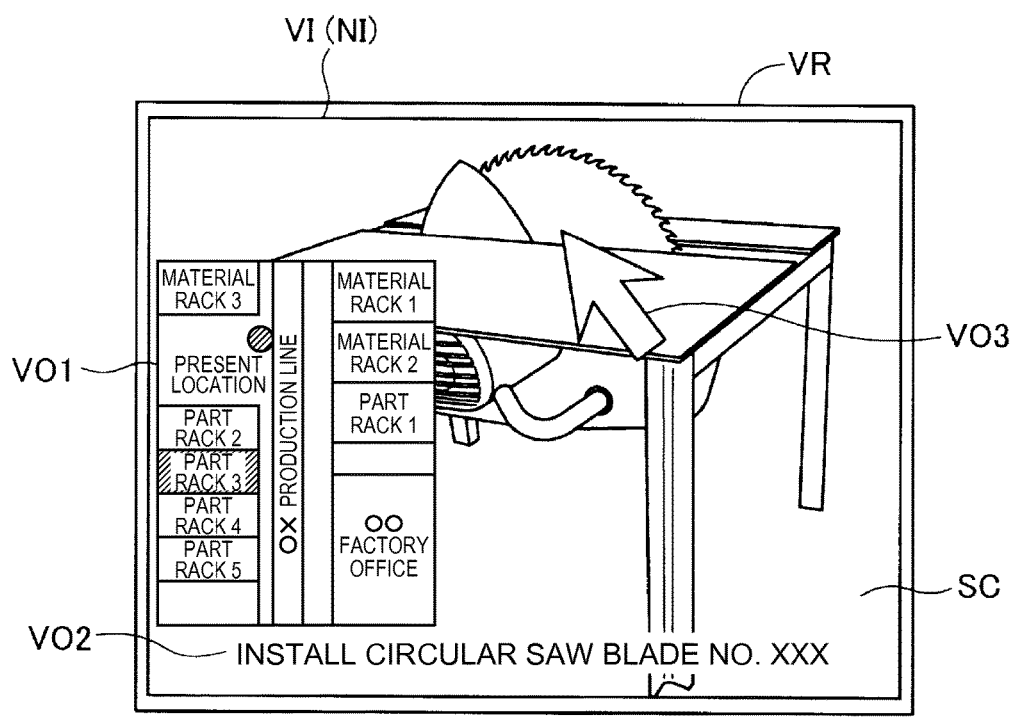
FIG. 6 is a diagram illustrating an example of a normal display image which is visually recognized by the user.

FIG. 6 is a diagram illustrating an example of the normal display image visually recognized by the user. In step S112 of FIG. 5, the augmented reality processing unit 142 displays the normal display image. Specifically, the augmented reality processing unit 142 transmits the normal display image generated in step S110 to the image processing unit 160. The image processing unit 160 having received the image performs the display process described in FIG. 2. As a result, as illustrated in FIG. 6, the user can visually recognize a virtual image VI showing a normal display image NI including the virtual objects VO1 to VO3 in the visual field VR. In addition, the user can visually recognize a target object (real object) decorated with the virtual objects VO1 to VO3 in external scenery SC on the background of the virtual image VI.

In the example illustrated in FIG. 6, the target object is a table cutter placed in a work site. The virtual object VO1 is an image of a map indicating a component location, the virtual object VO2 is text indicating an instruction for work content given to the user, and the virtual object VO3 is an image of an arrow assisting the instruction for the work content. The virtual objects VO1 and VO2 are disposed around the table cutter, and the virtual object VO3 is disposed so as to be superimposed on the table cutter. As mentioned above, the augmented reality processing unit 142 may display the virtual object around the target object, and may display the virtual object so as to be superimposed on the target object. FIG. 6 illustrates an example in which the single target object is correlated with the three virtual objects. However, the number of virtual objects correlated with a single target object is arbitrary, and may be one or more.

In step S114 of FIG. 5, in a case where the variable i is "0", the augmented reality processing unit 142 starts to measure a display time period of the normal display image NI. In step S116, the augmented reality processing unit 142 sets "1" to the variable i. Then, the augmented reality processing unit 142 makes the process proceed to step S102 and repeatedly performs the above-described processes.

As described above, in the normal display process (FIG. 5), the normal display processing portion 144 can display the virtual image VI including the virtual objects VO1 to VO3 for giving the augmented reality to the user of the HMD 100 on the image display section 20. The virtual objects VO1 to VO3 displayed in the normal display process have the "first display aspect" in which visibility of a virtual object of the user is prioritized, that is, a degree of the visibility hindrance is high.

A-2-3. Simple Display Process

Figure 7:
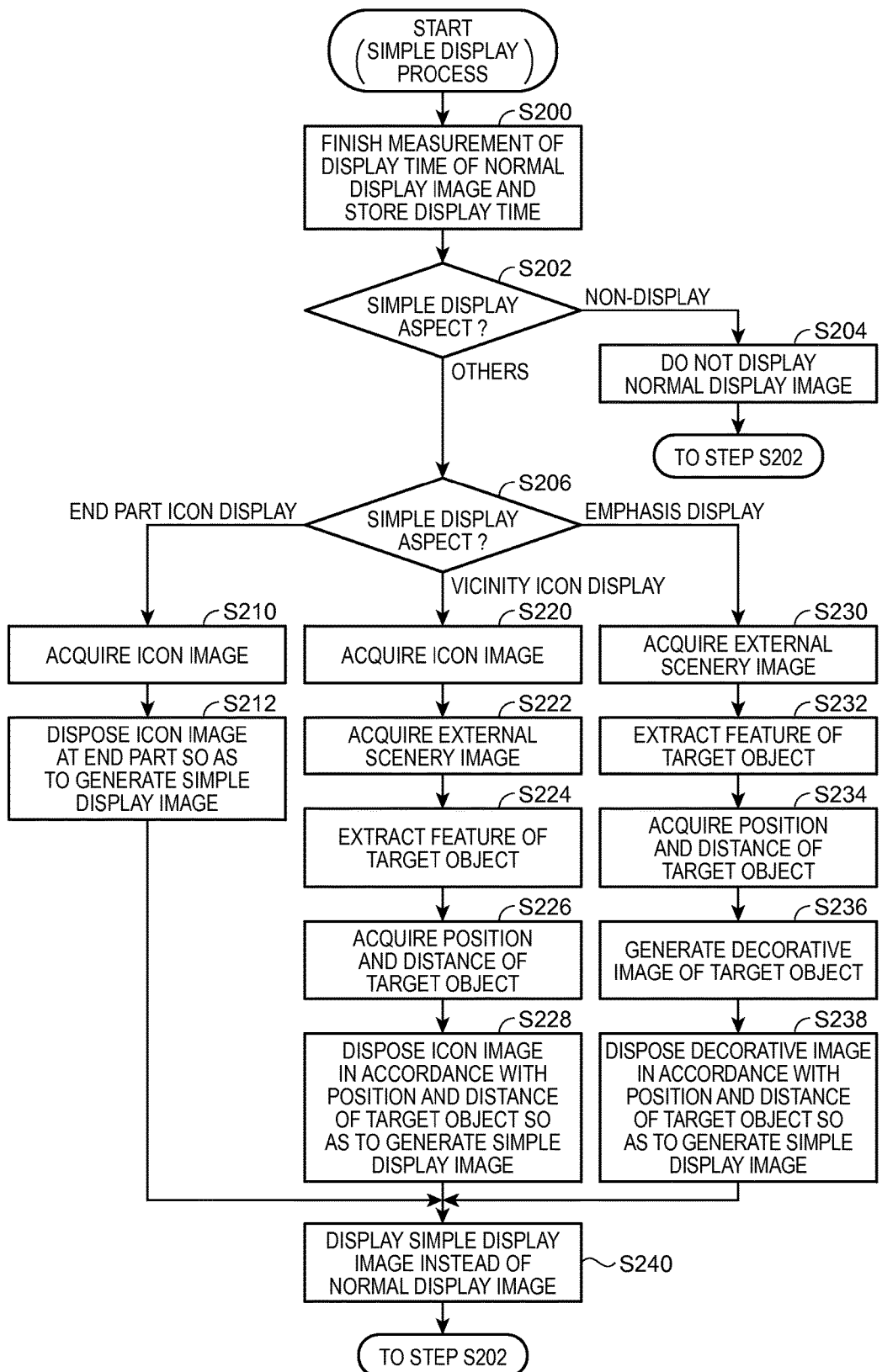
FIG. 7 is a flowchart illustrating procedures of a simple display process.

FIG. 7 is a flowchart illustrating procedures of the simple display process. The simple display process is a process for causing the image display section 20 to form a virtual image showing a virtual object in the second display aspect. The simple display process is started on the basis of an instruction from the augmented reality processing unit 142 and is performed by the simple display processing portion 146 in the simple display state ST2 (FIG. 4).

In step S200, the simple display processing portion 146 finishes the measurement of the display time period of the normal display image NI, started in step S114 of the normal display process (FIG. 5). The simple display processing portion 146 stores the measured display time period in the past retention time 122 in a form in which the time period can be differentiated from existing data.

In step S202, the simple display processing portion 146 acquires the simple display aspect 126 (a specific display aspect employed in the second display aspect). In steps S202 and S206, the simple display processing portion 146 refers to a value of the acquired simple display aspect 126.

Figure 8:
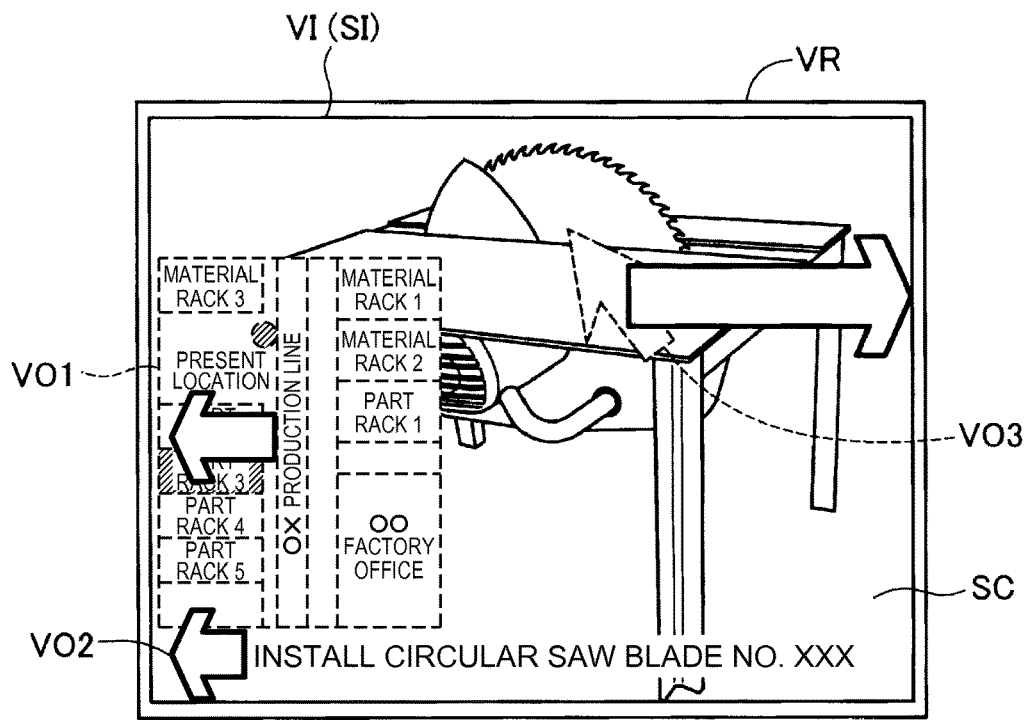
FIG. 8 is a diagram illustrating an example of non-display.

FIG. 8 is a diagram illustrating an example of non-display. In FIG. 7, if the simple display aspect 126 indicates "non-display" (step S202: non-display), the simple display processing portion 146 does not display the normal display image NI (FIG. 6) in step S204. Specifically, the simple display processing portion 146 may not display the normal display image NI by using any one of b1 to b4 exemplified below.

(b1) A virtual object is suddenly erased.

The simple display processing portion 146 does not display the normal display image NI in an aspect in which each of the virtual objects VO1 to VO3 is suddenly erased. Specifically, the simple display processing portion 146 stops transmitting the normal display image NI to the image processing unit 160. Alternatively, the simple display processing portion 146 transmits a request for stopping driving the display driving unit (the LCD or the backlight) to the display control unit 190. Consequently, the display of the virtual image VI showing the normal display image NI performed by the image display section 20 is stopped.

(b2) A virtual object is faded out to the outside of a border.

The simple display processing portion 146 does not display the normal display image NI in an aspect in which each of the virtual objects VO1 to VO3 is faded out to the outside of a border of the image. Specifically, the simple display processing portion 146 may repeatedly perform generation of a normal display image in the middle of each of the virtual objects VO1 to VO3 being faded out to the outside of the border of the normal display image NI and transmission of the generated image to the image processing unit 160. Consequently, as illustrated in FIG. 8, the position of the virtual object is gradually moved to the outside of the border of the image (a direction indicated by the arrow in FIG. 8) every time the process is repeatedly performed. As a result, the user may observe that the virtual object seems to disappear in stages to the outside of the border, and thus it is possible to reduce a sense of discomfort felt by the user due to a change in the display aspect.

(b3) A virtual object is faded out by increasing the transmittance of the virtual object.

The simple display processing portion 146 does not display the normal display image NI in an aspect in which the transmittance of the virtual objects VO1 to VO3 is gradually increased so that the virtual object is faded out. Specifically, the simple display processing portion 146 may repeatedly perform the generation of a normal display image in which n (where n is any integer) dots are extracted from each of the virtual objects VO1 to VO3 and transmission of the generated image to the image processing unit 160. Consequently, every time the process is repeatedly performed, dots of the virtual object are reduced by n. As a result, the user may observe that the virtual object seems to disappear in stages due to an increase in the transmission of the virtual object, and thus it is possible to reduce a sense of discomfort felt by the user due to a change in the display aspect. Instead of extracting the dots of the virtual object, the simple display processing portion 146 may replace the dots of the virtual object with black dots, may replace the virtual object with a virtual object of which only a contour is displayed, may increase an α value of the normal display image NI, and may decrease saturation of the normal display image NI.

(b4) A virtual object is faded out to the outside of the border while increasing the transmittance thereof.

This method is a combination of the method b2 and the method b3. Consequently, every time the process is repeatedly performed, the dots of the virtual object are reduced by n, and the position of the virtual object is also gradually moved to the outside of the border of the image (the direction indicated by the arrow in FIG. 8). As a result, the user may observe that the virtual object seems to disappear in stages to the outside of the border while the transmittance thereof is increased, and thus it is possible to reduce a sense of discomfort felt by the user due to a change in the display aspect.

Figure 9:
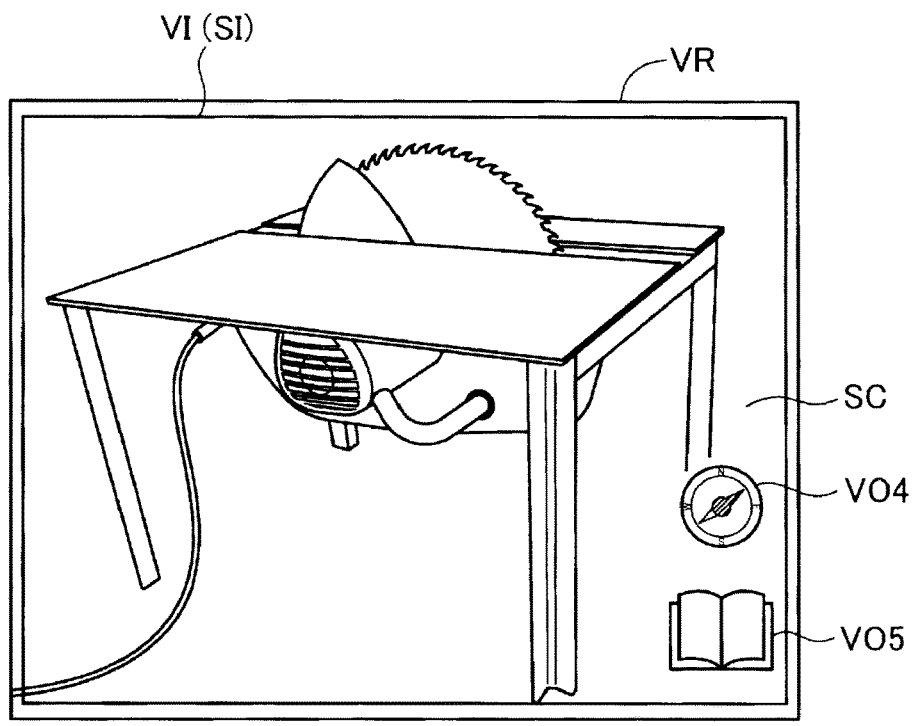
FIG. 9 is a diagram illustrating an example of end part icon display.

FIG. 9 is a diagram illustrating an example of end part icon display. In FIG. 7, if the simple display aspect 126 indicates "end part icon display" (step S202: others, and step S206: end part icon display), in step S210, the simple display processing portion 146 acquires one or a plurality of icon images corresponding to each of the virtual objects VO1 to VO3 displayed on the normal display image NI (FIG. 6). The simple display processing portion 146 may acquire the icon image from a database (not illustrated) of the HMD 100, and may acquire the icon image from a database (not illustrated) of another apparatus (a server or the like) connected to the HMD 100 via a network. The icon image may be correlated with the virtual object in a one-to-one relationship, and may be correlated with the virtual object in a one-to-many relationship, or a many-to-one relationship.

In step S212, the simple display processing portion 146 disposes all icon images acquired in step S210 at an end part so as to generate a simple display image. Here, the "end part" may be any part of the top, the bottom, the left, and the right. However, it is preferable to avoid a range of about 30° in the horizontal direction and about 20° in the vertical direction, which is an effective visual used to provide a lot of information, or a range of 60° to 90° in the horizontal direction and 45° to 70° in the vertical direction, which is a stable gazing field in which a gazing point is rapidly stabilized and viewed. The simple display processing portion 146 disposes black data in a region in which the icon image is not disposed in the simple display image, in order to improve the visibility of the external scenery SC when an image is displayed.

In step S240, the simple display processing portion 146 displays the generated simple display image instead of the normal display image NI (FIG. 6). As a result, as illustrated in FIG. 9, the user can visually recognize a virtual image VI showing a simple display image SI including virtual objects (icon images) VO4 and VO5 in the visual field VR. In addition, the user can visually recognize a target object (real object) decorated with the virtual objects VO4 and VO5 in external scenery SC on the background of the virtual image VI.

In the example illustrated in FIG. 9, in the same manner as in FIG. 6, the target object is a table cutter placed in a work site. The virtual object VO4 is an icon image of a map, and the virtual object VO5 is an icon image of a manual. The virtual object VO4 is correlated with the virtual object VO1.

The virtual object VO5 is correlated with the virtual objects VO2 and VO3. Both of the virtual objects VO4 and VO5 are disposed at a lower right end part of the simple display image SI.

Figure 10:
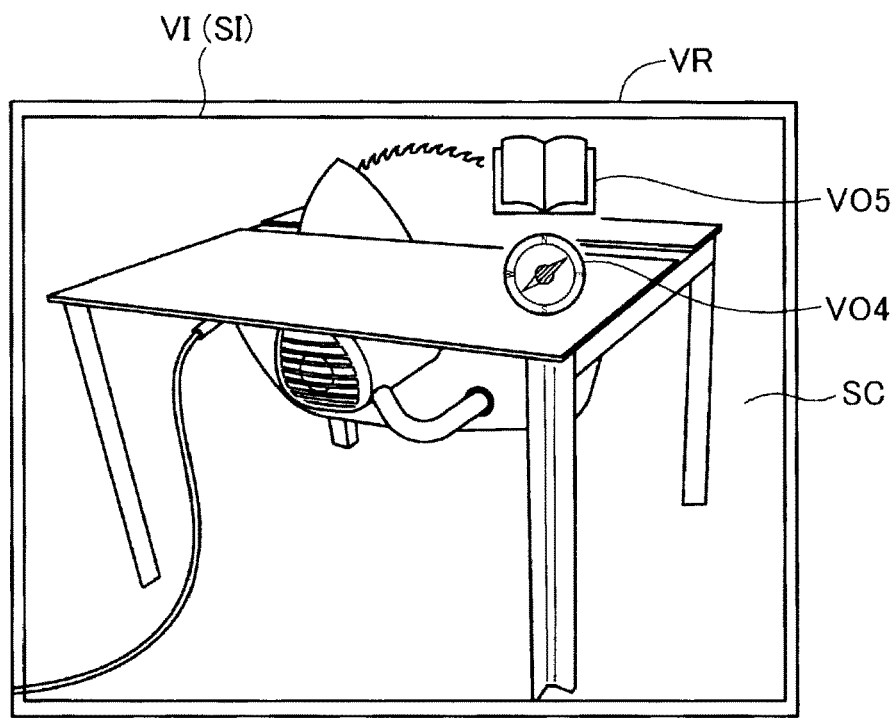
FIG. 10 is a diagram illustrating an example of vicinity icon display.

FIG. 10 is a diagram illustrating an example of vicinity icon display. In FIG. 7, if the simple display aspect 126 indicates "vicinity icon display" (step S202: others, and step S206: vicinity icon display), in step S220, the simple display processing portion 146 acquires one or a plurality of icon images corresponding to each of the virtual objects VO1 to VO3 displayed on the normal display image NI (FIG. 6). Details thereof are the same as those in step S210.

In step S222, the simple display processing portion 146 causes the cameras 61 to acquire an external scenery image. In step S224, the simple display processing portion 146 extracts a feature of a target object from the acquired external scenery image. Details thereof are the same as those in step S104 of FIG. 5. In step S226, the simple display processing portion 146 acquires a position and a distance of the target object. Details thereof are the same as those in step S106.

In step S228, the simple display processing portion 146 disposes the icon image in accordance with the position and the distance of the target object so as to generate a simple display image. Specifically, the simple display processing portion 146 processes the icon image acquired in step S220 so as to have a size corresponding to the distance of the target object acquired in step S226 and disposes the icon image at a position (vicinity) corresponding to the position of the target object acquired in step S226. The simple display processing portion 146 disposes black data in a region in which the icon image is not disposed in the simple display image, in order to improve the visibility of the external scenery SC when an image is displayed.

In step S240, the simple display processing portion 146 displays the generated simple display image instead of the normal display image NI (FIG. 6). As a result, as illustrated in FIG. 10, the user can visually recognize a virtual image VI showing a simple display image SI including virtual objects (icon images) VO4 and VO5 in the visual field VR. In the example illustrated in FIG. 10, the target object and the virtual objects VO4 and VO5 are the same as those illustrated in FIG. 9. A difference between FIGS. 10 and 9 is that the virtual objects are disposed not at the end part of the simple display image but in the vicinity of the target object (real object).

Figure 11:
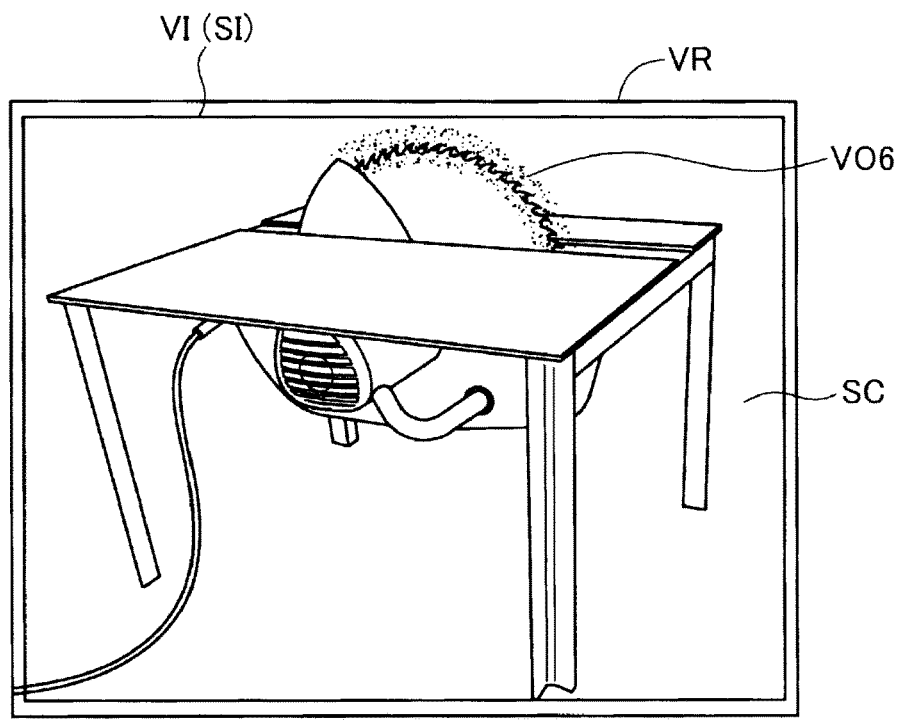
FIG. 11 is a diagram illustrating an example of emphasis display.

FIG. 11 is a diagram illustrating an example of emphasis display. In FIG. 7, if the simple display aspect 126 indicates "emphasis display" (step S202: others, and step S206: emphasis display), in step S230, the simple display processing portion 146 causes the cameras 61 to acquire an external scenery image. In step S232, the simple display processing portion 146 extracts a feature of a target object from the acquired external scenery image. Details thereof are the same as those in step S104 of FIG. 5. In step S234, the simple display processing portion 146 acquires a position and a distance of the target object. Details thereof are the same as those in step S106.

In step S236, the simple display processing portion 146 generates a decorative image of the target object. Specifically, the simple display processing portion 146 generates an image for decorating at least a part of the target object on the basis of the feature of the target object specified in step S232 and the position and the distance of the target object acquired in step S234. Here, the "decoration" indicates emphasis. For this reason, the "decorative image" indicates an image which causes at least a part of the target object to appear to emit light (including lighting and blinking), an image for bordering at least a part of the target object, or an image which causes at least a part of the target object to appear to be embossed.

In step S238, the simple display processing portion 146 disposes the decorative image acquired in step S236 in accordance with the position and the distance of the target object so as to generate a simple display image. The simple display processing portion 146 disposes black data in a region in which the decorative image is not disposed in the simple display image, in order to improve the visibility of the external scenery SC when an image is displayed.

In step S240, the simple display processing portion 146 displays the generated simple display image instead of the normal display image NI (FIG. 6). As a result, as illustrated in FIG. 11, the user can visually recognize a virtual image VI showing a simple display image SI including a virtual object (decorative image) VO6 in the visual field VR.

In the example illustrated in FIG. 11, in the same manner as in FIG. 6, the target object (real object) is a table cutter placed in a work site. The virtual object VO6 is a decorative image for emphasizing a part of the table cutter, that is, a blade part.

After step S240 of FIG. 7 is finished, the simple display processing portion 146 makes the process proceed to step S202, and repeatedly performs the above-described processes.

As mentioned above, in the simple display process (FIG. 7), in a case where the simple display aspect 126 indicates anyone of the "end part icon display", the "vicinity icon display", and the "emphasis display", the simple display processing portion 146 can display the virtual image VI including the virtual objects VO4 to VO6 for giving the augmented reality to the user of the HMD 100 on the image display section 20. The virtual objects VO4 to VO6 displayed in the simple display process have the "second display aspect" in which visibility of external scenery of the user is prioritized, that is, a degree of the visibility hindrance is low.

As described above, according to the simple display process (FIG. 7), it is possible to suggest content of the virtual objects in the first display aspect by using the virtual objects (VO4 to VO6 in FIGS. 8, 9, 10 and 11) in the second display aspect, having a smaller occupied area by the virtual object in the virtual image VI than the area occupied by the virtual objects (VO1 to VO3 in FIG. 6) in the first display aspect.

In each description of the end part icon display, the vicinity icon display, and the emphasis display, transition between the normal display image NI (FIG. 6) and the simple display image SI (FIGS. 9, 10 and 11) is suddenly performed. However, transition from the normal display image NI to the simple display image SI may be gradually performed. Specifically, a method such as the methods b2 to b4 of step S204 may be used. In the above-described way, the user may observe that the normal display image NI appears to change to the simple display image SI in stages, and thus it is possible to reduce a sense of discomfort felt by the user due to a change in the display aspect.

In each description of the end part icon display and the vicinity icon display, the virtual objects VO4 and VO5 are icon images. In the description of the emphasis display, the virtual object VO6 is a graphic image. However, the virtual objects in the second display aspect may not necessarily be an icon image or a graphic image. A virtual object in the second display aspect may employ any form as long as text, a graphic, a pattern, a symbol, and a combination thereof can suggest content of the virtual objects (VO1 to VO3 in FIG. 6) in the first display aspect. For example, a virtual object in the second display aspect may be simple text, may be a simple symbol, and may be a combination of a pattern and text.

Hereinafter, a description will be made of procedures of monitoring the establishment of the transition conditions 1 to 3, performed by the augmented reality processing unit 142 in the augmented reality process.

A-2-4. Monitoring of Establishment of Transition Condition 1

Figure 12:
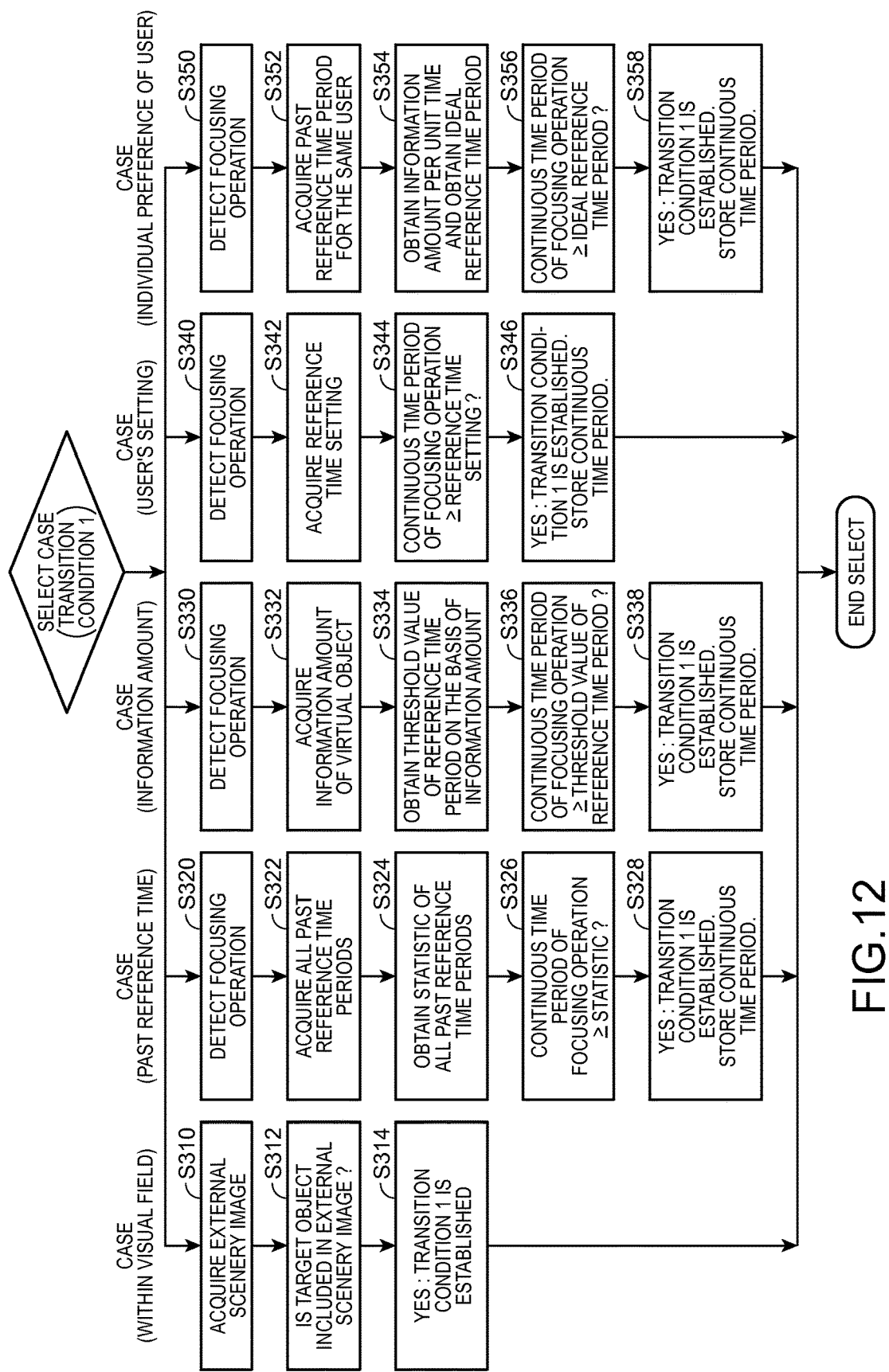
FIG. 12 is a flowchart illustrating procedures of monitoring the establishment of a transition condition 1.

FIG. 12 is a flowchart illustrating procedures of monitoring the establishment of the transition condition 1. Among at least one of conditions 1-1 to 1-5 listed below is set in the augmented reality processing unit 142 in advance as the transition condition 1. The augmented reality processing unit 142 determines that the transition condition 1 is established in a case where any one of the set conditions 1-1 to 1-5 is established.

(1-1) In a case where a real object which is a display target of a virtual object enters a visual field of the user (1-2) In a case where a focusing operation performed by the user is continuously performed for a time period which is equal to or greater than a statistic of a reference time period in the past augmented reality process (1-3) In a case where a focusing operation performed by the user is continuously performed for a time period which is equal to or longer than a time period which is obtained on the basis of an information amount of a virtual object (1-4) In a case where a focusing operation performed by the user is continuously performed for a time period which is equal to or longer than a value which is set by the user (1-5) In a case where a focusing operation performed by the user is continuously performed for a time period which is equal to or longer than a time period which is obtained by taking into consideration an individual preference of the user and an information amount of a virtual object Next, with reference to FIG. 12, a description will be made of specific procedures for determining establishment of the conditions 1-1 to 1-5 in the augmented reality processing unit 142.

(1-1) CASE (within Visual Field): In a Case where a Real Object which is a Display Target of a Virtual Object Enters the Visual Field of the User In step S310, the augmented reality processing unit 142 acquires an external scenery image by using the cameras 61. In step S312, the augmented reality processing unit 142 performs image recognition on the acquired external scenery image so as to determine whether or not a real object which is a display target of a virtual object is included in the external scenery image. The "real object which is a display target of a virtual object" is the "target object" in the normal display process (FIG. 5).

If the target object is included therein (step S312: YES), the augmented reality processing unit 142 determines that the transition condition 1 is established in step S314. If the target object is not included therein, the augmented reality processing unit 142 continues to monitor establishment of the conditions 1-1 to 1-5.

As mentioned above, if the condition 1-1 is used, the augmented reality processing unit 142 can determine that the transition condition 1 is established in a case where a real object (target object) which is a display target of a virtual object enters a visual field of the user, and can cause a state (FIG. 4) of the augmented reality process to transition from an initial state to the normal display state ST1. As a result, the normal display process (FIG. 5) is performed by the normal display processing portion 144, and the HMD 100 allows the user to visually recognize a virtual image VI (FIG. 6) including a virtual object in the first display aspect.

(1-2) CASE (Past Reference Time): In a Case where a Focusing Operation Performed by the User is Continuously Performed for a Time Period which is Equal to or Longer than a Statistic of a Reference Time Period in the Past Augmented Reality Process In step S320, the augmented reality processing unit 142 detects starting of a focusing operation (an operation in which the user focuses on a specific point) performed by the user. In the present embodiment, in a case where a visual line of the user acquired by the visual line acquisition unit (the visual line detection unit 62 and the augmented reality processing unit 142 of the CPU 140) is not moved from a certain point for a predetermined time period or more, it may be determined that a focusing operation has been started. The predetermined time period may be set to any value. In the determination of whether or not a visual line is "moved from a certain point", it is preferable to allow shifts within a predetermined range in consideration of shifts of a visual line due to nystagmus. In a case where the hand of the user acquired by the motion detection unit (the cameras 61 and the augmented reality processing unit 142 of the CPU 140) is not moved from a certain point for a predetermined time period or more, it may be determined that a focusing operation has been started. Also in this case, in the determination of whether or not the hand is "moved from a certain point", it is preferable to allow shifts within a predetermined range in consideration of hand shaking.

In step S322, the augmented reality processing unit 142 acquires not only history of a reference time period (hereinafter, also referred to as a "past reference time period") used in the past augmented reality process, stored in the past reference time 124 but also history associated with other users. In step S322, the augmented reality processing unit 142 functions as a "reference time acquisition unit", and the past reference time 124 functions as "reference time information".

In step S324, the augmented reality processing unit 142 obtains a statistic of the past reference time periods by using the acquired history. The statistic may be obtained by using any statistical method, and may be, for example, an average value, a mode, or a median. The augmented reality processing unit 142 sets the obtained statistic as a "reference time period used in the present process".

In step S326, the augmented reality processing unit 142 determines whether or not a continuous time period of the focusing operation of the user of which the starting is detected in step S320 is equal to or longer than the reference time period used in the present process (the statistic in step S324).

If the continuous time period of the focusing operation is equal to or longer than the statistics (step S326: YES), in step S328, the augmented reality processing unit 142 determines that the transition condition 1 is established. The augmented reality processing unit 142 stores an actual continuous time period of the focusing operation of the user of which starting is detected in step S320, an information amount of a virtual object in the first display aspect, and an identifier of the user in the past reference time 124. A method of obtaining an information amount of a virtual object in the first display aspect will be described in step S332.

In step S328, the augmented reality processing unit 142 specifies a real object which is a target of the focusing operation. Specifically, the augmented reality processing unit 142 may specify a real object which is a target of the focusing operation by checking a direction of the visual line of the user detected in step S320 with the external scenery image obtained by the cameras 61. The "real object which is a target of the focusing operation" is a "target object" in the normal display process (FIG. 5) and the simple display process (FIG. 7). In a case of using a motion of the hand of the user in step S320, the augmented reality processing unit 142 may perform image analysis on the external scenery image obtained by the cameras 61, and may specify an object indicated by the hand (for example, a fingertip) of the user as a real object which is a target of the focusing operation.

In a case where the focusing operation is finished before the statistic or greater is reached, the augmented reality processing unit 142 continues to monitor establishment of the conditions 1-1 to 1-5.

As mentioned above, if the condition 1-2 is used, the augmented reality processing unit 142 can automatically change a reference time period used in the present augmented reality process on the basis of a statistic of a reference time period (past reference time period) used in the past augmented reality process, that is, a tendency of the past reference time period. In a case where a continuous time period of a focusing operation of the user is equal to or longer than a reference time period used in the present augmented reality process, the augmented reality processing unit 142 determines that the transition condition 1 is established and can thus cause a state (FIG. 4) of the augmented reality process to transition from the initial state to the normal display state ST1.

(1-3) CASE (Information Amount): In a Case where a Focusing Operation Performed by the User is Continuously Performed for a Time Period which is Equal to or Longer than a Time Period which is Obtained on the Basis of an Information Amount of a Virtual Object In step S330, the augmented reality processing unit 142 detects starting of a focusing operation performed by the user. Details thereof are the same as those in step S320.

In step S332, the augmented reality processing unit 142 acquires an information amount of a virtual object. Specifically, the augmented reality processing unit 142 specifies a real object (that is, a target object) which is a target of the focusing operation detected in step S320. Details thereof are the same as those in step S326. The augmented reality processing unit 142 acquires one or a plurality of virtual objects (virtual objects in the first display aspect) corresponding to the specified target object. Details thereof are the same as those in step S108 of FIG. 5. The augmented reality processing unit 142 obtains an amount of information regarding one or the plurality of acquired virtual objects. The augmented reality processing unit 142 may obtain an information amount of the virtual object, for example, by using any one of methods c1 to c3 described below. In a case where a plurality of virtual objects are acquired, as an information amount, an average value of amounts of information regarding the plurality of virtual objects may be used, or a sum value of amounts of information regarding the plurality of virtual objects may be used.

(c1) A file size of a virtual object: The augmented reality processing unit 142 preferably employs the method c1 in a case where a virtual object is formed of text and an image, in a case where a virtual object is a video, and in a case where the kind of virtual object is unclear.

(c2) The number of letters included in a virtual object: The augmented reality processing unit 142 preferably employs the method c2 in a case where a virtual object is text.

(c3) A ratio of black dots when a virtual object is binarized: The augmented reality processing unit 142 preferably employs the method c3 in a case where a virtual object is an image.

If the above-described methods c1 to c3 are used, the augmented reality processing unit 142 can obtain an information amount of a virtual object in the first display aspect in a method suitable for the kind of virtual object, and thus it is possible to understand an information amount of the virtual object more accurately.

In step S334, the augmented reality processing unit 142 obtains a threshold value of a reference time period used in the present process on the basis of the information amount of the virtual object acquired in step S332. The threshold value may be obtained by using any method, and, for example, a value obtained by multiplying an information amount by a predetermined coefficient may be used as the threshold value, and the threshold value may be obtained by using a table in which information amount candidates are correlated with threshold value candidates. The augmented reality processing unit 142 sets the obtained threshold value as a "reference time period used in the present process".

In step S336, the augmented reality processing unit 142 determines whether or not a continuous time period of the focusing operation of the user of which the starting is detected in step S330 is equal to or longer than the reference time period used in the present process (the threshold value in step S334).

If the continuous time period of the focusing operation is equal to or greater than the threshold value (step S336: YES), in step S338, the augmented reality processing unit 142 determines that the transition condition 1 is established. Processes (storing in the past reference time 124, and specifying of a real object which is a target of the focusing operation) after the transition condition 1 is established are the same as those in step S328. In a case where the focusing operation is finished before the threshold value or greater is reached, the augmented reality processing unit 142 continues to monitor establishment of the conditions 1-1 to 1-5.

As mentioned above, if the condition 1-3 is used, the augmented reality processing unit 142 can change a reference time period used in the present augmented reality process on the basis of an information amount of a virtual object (VO1 to VO3 in FIG. 6) in the first display aspect, which occupies a large area in a virtual image VI (a degree of the visibility hindrance is high). In the above-described way, for example, the augmented reality processing unit 142 can make a reference time period in a case where an information amount of a virtual object in the first display aspect is large, in other words, display of a virtual object in transition from an initial state to the first display aspect is likely to hinder visual recognition of a real object longer than a reference time period in a case where an information amount is small, and thus it is possible to improve a user's convenience. In addition, in a case where a continuous time period of a focusing operation performed by the user is equal to or longer than a reference time period used in the present augmented reality process, the augmented reality processing unit 142 determines that the transition condition 1 is established, and can thus cause a state (FIG. 4) of the augmented reality process to transition to the normal display state ST1.

(1-4) CASE (User's Setting): In a Case where a Focusing Operation Performed by the User is Continuously Performed for a Time Period which is Equal to or Longer than a Value which is Set by the User In step S340, the augmented reality processing unit 142 detects starting of a focusing operation performed by the user. Details thereof are the same as those in step S320.

In step S342, the augmented reality processing unit 142 acquires a set value of a reference time period which is set by the user, stored in the reference time setting 125. The augmented reality processing unit 142 functions as a "reference time acquisition unit" in step S342. The augmented reality processing unit 142 sets the acquired set value as a "reference time period used in the present process".

In step S344, the augmented reality processing unit 142 determines whether or not a continuous time period of the focusing operation of the user of which the starting is detected in step S340 is equal to or longer than the reference time period used in the present process (the set value in step S342).

If the continuous time period of the focusing operation is equal to or greater than the set value (step S344: YES), in step S346, the augmented reality processing unit 142 determines that the transition condition 1 is established. Processes (storing in the past reference time 124, and specifying of a real object which is a target of the focusing operation) after the transition condition 1 is established are the same as those in step S328. In a case where the focusing operation is finished before the set value or greater is reached, the augmented reality processing unit 142 continues to monitor establishment of the conditions 1-1 to 1-5.

As mentioned above, if the condition 1-4 is used, the augmented reality processing unit 142 can change a reference time period used in the present augmented reality process on the basis of a set value which is preferred by the user and is stored in the reference time setting 125. In addition, in a case where a continuous time period of a focusing operation performed by the user is equal to or longer than a reference time period used in the present augmented reality process, the augmented reality processing unit 142 determines that the transition condition 1 is established, and can thus cause a state (FIG. 4) of the augmented reality process to transition from an initial state to the normal display state ST1.

(1-5) CASE (Individual Preference of the User): In a Case where a Focusing Operation Performed by the User is Continuously Performed for a Time Period which is Equal to or Longer than a Time Period which is Obtained by Taking into Consideration an Individual Preference of the User and an Information Amount of a Virtual Object In step S350, the augmented reality processing unit 142 detects starting of a focusing operation performed by the user. Details thereof are the same as those in step S320.

In step S352, the augmented reality processing unit 142 acquires history associated with the present user of the HMD 100 on the basis of history of a reference time period used in the past augmented reality process, stored in the past reference time 124. The augmented reality processing unit 142 may search the past reference time 124 with an identifier of the user as a key. The augmented reality processing unit 142 functions as a "reference time acquisition unit" in step S352.

In step S354, the augmented reality processing unit 142 obtains an information amount in which the user of the HMD 100 can focus per unit time by dividing an "information amount" of the acquired history by the "continuous time period of the focusing operation". Next, the augmented reality processing unit 142 obtains an ideal reference time period by dividing an information amount of a virtual object in the first display aspect by the obtained information amount (the information amount in which the user can focus per unit time). The augmented reality processing unit 142 sets the obtained ideal reference time period as a "reference time period used in the present process". A method of obtaining an information amount of a virtual object in the first display aspect is the same as in step S332.

In step S356, the augmented reality processing unit 142 determines whether or not a continuous time period of the focusing operation of the user of which the starting is detected in step S350 is equal to or longer than the reference time period used in the present process (the ideal reference time period in step S354).

If the continuous time period of the focusing operation is equal to or longer than the ideal reference time period (step S356: YES), in step S358, the augmented reality processing unit 142 determines that the transition condition 1 is established. Processes (storing in the past reference time 124, and specifying of a real object which is a target of the focusing operation) after the transition condition 1 is established are the same as those in step S328. In a case where the focusing operation is finished before the ideal reference time period or greater is reached, the augmented reality processing unit 142 continues to monitor establishment of the conditions 1-1 to 1-5.

As mentioned above, if the condition 1-5 is used, the augmented reality processing unit 142 can obtain an information amount in which the user can focus per unit time by using the reference time information (the past reference time 124). For this reason, the augmented reality processing unit 142 can change a reference time period used in the present augmented reality process on the basis of, for example, the obtained information amount (an information amount in which the user can focus per unit time) and an information amount of a virtual object (VO1 to VO3 in FIG. 6) in the first display aspect. In the above-described way, the augmented reality processing unit 142 can make a reference time period in a case where an information amount in which the user can focus per unit time is small, in other words, display of a virtual object in transition from an initial state to the first display aspect is likely to hinder visual recognition of a real object longer than a reference time period in a case where an information amount is large. As a result, the augmented reality processing unit 142 can change a reference time period according to an individual preference of the user, and thus it is possible to improve a user's convenience. In addition, in a case where a continuous time period of a focusing operation performed by the user is equal to or longer than a reference time period used in the present augmented reality process, the augmented reality processing unit 142 determines that the transition condition 1 is established, and can thus cause a state (FIG. 4) of the augmented reality process to transition from an initial state to the normal display state ST1.

As described above, according to the augmented reality process (transition from an initial state to the normal display state ST1 due to establishment of the transition condition 1), the augmented reality processing unit 142 causes the image display section 20 to form the virtual image VI (NI) including the virtual objects (VO1 to VO3 in FIG. 6) in the first display aspect in relation to a real object (target object) on which at least a focusing operation is performed when the focusing operation is continuously performed for a predetermined reference time period. In the above-described way, since the virtual object is displayed according to a user's intention such as a continuous focusing operation, a user can maintain a state in which a real object which actually exists in the real world is easily visually recognized as long as the user does not continuously perform the focusing operation.

As a result, it is possible to provide a head mounted display (the HMD 100) in which display of a virtual object is unlikely to hinder visual recognition of a real object or the background thereof.

In addition, according to the augmented reality process (monitoring of establishment of the transition condition 1), the augmented reality processing unit 142 can change a reference time period for switching a display aspect to the first display aspect (FIG. 6) in which an area occupied by the virtual objects VO1 to VO3 in the virtual image VI is large (a degree of the visibility hindrance is high), for example, depending on various conditions as listed in the conditions 1-2 to 1-5 after the augmented reality process is started.

In the augmented reality process (monitoring of establishment of the transition condition 1), since a visual line of the user acquired by the visual line acquisition unit (the visual line detection unit 62 and the augmented reality processing unit 142 of the CPU 140) is used, the user can perform a focusing operation by using the visual line without moving the hand or the foot. For this reason, the user can easily perform a focusing operation even when performing work in which it is difficult for the user to freely use his or her hand. In the augmented reality process (monitoring of establishment of the transition condition 1), since a motion of the user's hand acquired by the motion detection unit (the cameras 61 and the augmented reality processing unit 142 of the CPU 140) is used, the user can easily perform a focusing operation by using a motion of the hand which is familiar in a normal action.

A-2-5. Monitoring of Establishment of Transition Condition 3

Procedures of monitoring the establishment of the transition condition 3 are nearly the same as those of the transition condition 1 illustrated in FIG. 12. Hereinafter, difference therebetween will be described. Among at least one of conditions 3-1 to 3-5 listed below is set in the augmented reality processing unit 142 in advance as the transition condition 3. The augmented reality processing unit 142 determines that the transition condition 3 is established in a case where any one of the set conditions 3-1 to 3-5 is established.

(3-1) In a case where a real object which is a display target of a virtual object enters a visual field of the user, and the user performs a predetermined operation (3-2) In a case where a focusing operation performed by the user is continuously performed for a time period which is equal to or longer than a statistic of a reference time period in the past augmented reality process (3-3) In a case where a focusing operation performed by the user is continuously performed for a time period which is equal to or longer than a time period which is obtained on the basis of an information amount of a virtual object (3-4) In a case where a focusing operation performed by the user is continuously performed for a time period which is equal to or longer than a value which is set by the user (3-5) In a case where a focusing operation performed by the user is continuously performed for a time period which is equal to or longer than a time period which is obtained by taking into consideration an individual preference of the user and an information amount of a virtual object (3-1) In a Case where a Real Object which is a Display Target of a Virtual Object Enters the Visual Field of the User, and the User Performs a Predetermined Operation Processes in steps S310 and S312 are the same as those in FIG. 12. If the target object is included in step S312 (step S312: YES), the augmented reality processing unit 142 monitors whether or not a predetermined operation is performed by the user. As the predetermined operation, any operation may be employed as long as the operation is different from the invalidation action described in FIG. 4, and, for example, a specific "gesture" may be employed. A method of acquiring a gesture is the same as a method of acquiring an invalidation action. If the predetermined operation is performed, in step S314, the augmented reality processing unit 142 determines that the transition condition 3 is established.

As mentioned above, if the condition 3-1 is used, the augmented reality processing unit 142 can determine that the transition condition 3 is established in a case where a real object (target object) which is a display target of a virtual object enters a visual field of the user and the user performs a predetermined operation, and can cause a state (FIG. 4) of the augmented reality process to transition from the simple display state ST2 to the normal display state ST1.

(3-2) In a Case where a Focusing Operation Performed by the User is Continuously Performed for a Time Period which is Equal to or Longer than a Statistic of a Reference Time Period in the Past Augmented Reality Process Processes in steps S320 to S326 are the same as those in FIG. 12. In step S328, the augmented reality processing unit 142 determines that the transition condition 3 is established and then performs storing on the past reference time 124 (in the same manner as in step S328). Next, the augmented reality processing unit 142 specifies either of the following real objects d1 and d2. A specifying method is the same as in step S328.

(d1) A real object which is a target of the focusing operation (d2) A real object which is a target of the focusing operation and is correlated with a virtual object in the second display aspect As mentioned above, if the condition 3-2 is used, in the same manner as in the condition 1-2, the augmented reality processing unit 142 can automatically change a reference time period used in the present augmented reality process on the basis of a tendency of a statistic of a reference time period (past reference time period) used in the past augmented reality process. In a case where a continuous time period of a focusing operation of the user is equal to or longer than a reference time period used in the present augmented reality process, the augmented reality processing unit 142 determines that the transition condition 3 is established and can thus cause a state (FIG. 4) of the augmented reality process to transition from the simple display state ST2 to the normal display state ST1.

(3-3) In a Case where a Focusing Operation Performed by the User is Continuously Performed for a Time Period which is Equal to or Longer than a Time Period which is Obtained on the Basis of an Information Amount of a Virtual Object Processes in steps S330, S334 and S336 are the same as those in FIG. 12. In relation to steps S332 and S338, the description of the "real object which is a target of the focusing operation" may be replaced with "either of the real objects d1 and d2 described in the condition 3-2".

As mentioned above, if the condition 3-3 is used, in the same manner as in the condition 1-3, the augmented reality processing unit 142 can change a reference time period used in the present augmented reality process on the basis of an information amount of a virtual object (VO1 to VO3 in FIG. 6) in the first display aspect, which occupies a large area in a virtual image VI (a degree of the visibility hindrance is high). In the above-described way, for example, the augmented reality processing unit 142 can make a reference time period in a case where an information amount of a virtual object in the first display aspect is large, in other words, display of a virtual object in transition from the second display aspect (FIGS. 8, 9, 10 and 11) to the first display aspect is likely to hinder visual recognition of a real object longer than a reference time period in a case where an information amount is small, and thus it is possible to improve a user's convenience. In addition, in a case where a continuous time period of a focusing operation performed by the user is equal to or longer than a reference time period used in the present augmented reality process, the augmented reality processing unit 142 determines that the transition condition 3 is established and can thus cause a state (FIG. 4) of the augmented reality process to transition from the simple display state ST2 to the normal display state ST1.

(3-4) In a Case where a Focusing Operation Performed by the User is Continuously Performed for a Time Period which is Equal to or Longer than a Value which is Set by the User Processes in steps S340 to S344 are the same as those in FIG. 12. In relation to step S346, the description of the "real object which is a target of the focusing operation" may be replaced with "either of the real objects d1 and d2 described in the condition 3-2".

As mentioned above, if the condition 3-4 is used, in the same manner as in the condition 1-4, the augmented reality processing unit 142 can change a reference time period used in the present augmented reality process on the basis of a set value which is preferred by the user and is stored in the reference time setting 125. In addition, in a case where a continuous time period of a focusing operation performed by the user is equal to or longer than a reference time period used in the present augmented reality process, the augmented reality processing unit 142 determines that the transition condition 3 is established, and can thus cause a state (FIG. 4) of the augmented reality process to transition from the simple display state ST2 to the normal display state ST1.

(3-5) In a Case where a Focusing Operation Performed by the User is Continuously Performed for a Time Period which is Equal to or Longer than a Time Period which is Obtained by Taking into Consideration an Individual Preference of the User and an Information Amount of a Virtual Object Processes in steps S350 to S356 are the same as those in FIG. 12. In relation to step S358, the description of the "real object which is a target of the focusing operation" may be replaced with "either of the real objects d1 and d2 described in the condition 3-2".

As mentioned above, if the condition 3-5 is used, in the same manner as in the condition 1-5, the augmented reality processing unit 142 can change a reference time period used in the present augmented reality process on the basis of, for example, an information amount in which the user can focus per unit time and an information amount of a virtual object (VO1 to VO3 in FIG. 6) in the first display aspect. In the above-described way, the augmented reality processing unit 142 can make a reference time period in a case where an information amount in which the user can focus per unit time is small, in other words, display of a virtual object in transition from the second display aspect (FIGS. 8, 9, 10 and 11) to the first display aspect is likely to hinder visual recognition of a real object longer than a reference time period in a case where an information amount is large. As a result, the augmented reality processing unit 142 can change a reference time period according to an individual preference of the user, and thus it is possible to improve a user's convenience. In addition, in a case where a continuous time period of a focusing operation performed by the user is equal to or longer than a reference time period used in the present augmented reality process, the augmented reality processing unit 142 determines that the transition condition 3 is established, and can thus cause a state (FIG. 4) of the augmented reality process to transition from the simple display state ST2 to the normal display state ST1.

As described above, according to the augmented reality process (transition from the simple display state ST2 to the normal display state ST1 due to establishment of the transition condition 3), after the image display section 20 forms the virtual image VI (SI) including the virtual objects (VO4 to VO6 in FIGS. 8, 9, 10 and 11) in the second display aspect, the augmented reality processing unit 142 can cause the image display section 20 to form the virtual image VI (NI) including the virtual objects (VO1 to VO3 in FIG. 6) in the first display aspect, having a larger occupied area by the virtual object (a high degree of the visibility hindrance) in the virtual image than an area of virtual objects in the second display aspect when the focusing operation is continuously performed on a virtual object (d2) for a predetermined reference time period in addition to a real object (d1). In the above-described way, since a display aspect of the virtual object transitions from the second display aspect to the first display aspect according to a user's intention such as a continuous focusing operation, the user can maintain a state in which a real object which actually exists in the real world is easily visually recognized as long as the user does not continuously perform the focusing operation. In other words, the user can control a degree of the visibility hindrance of a virtual object according to the user's intention. As a result, it is possible to provide a head mounted display (the HMD 100) in which display of a virtual object is unlikely to hinder visual recognition of a real object or the background thereof.

In addition, according to the augmented reality process (monitoring of establishment of the transition condition 3), the augmented reality processing unit 142 can change a reference time period for switching a display aspect from the second display aspect (FIGS. 8, 9, 10 and 11) in which an area occupied by the virtual objects VO4 to VO6 in the virtual image VI is small (a degree of the visibility hindrance is low), to the first display aspect (FIG. 6) in which an area occupied by the virtual objects VO1 to VO3 in the virtual image VI is large (a degree of the visibility hindrance is high), for example, depending on various conditions as listed in the conditions 3-2 to 3-5.

A-2-6. Monitoring of Establishment of Transition Condition 2

Figure 13:
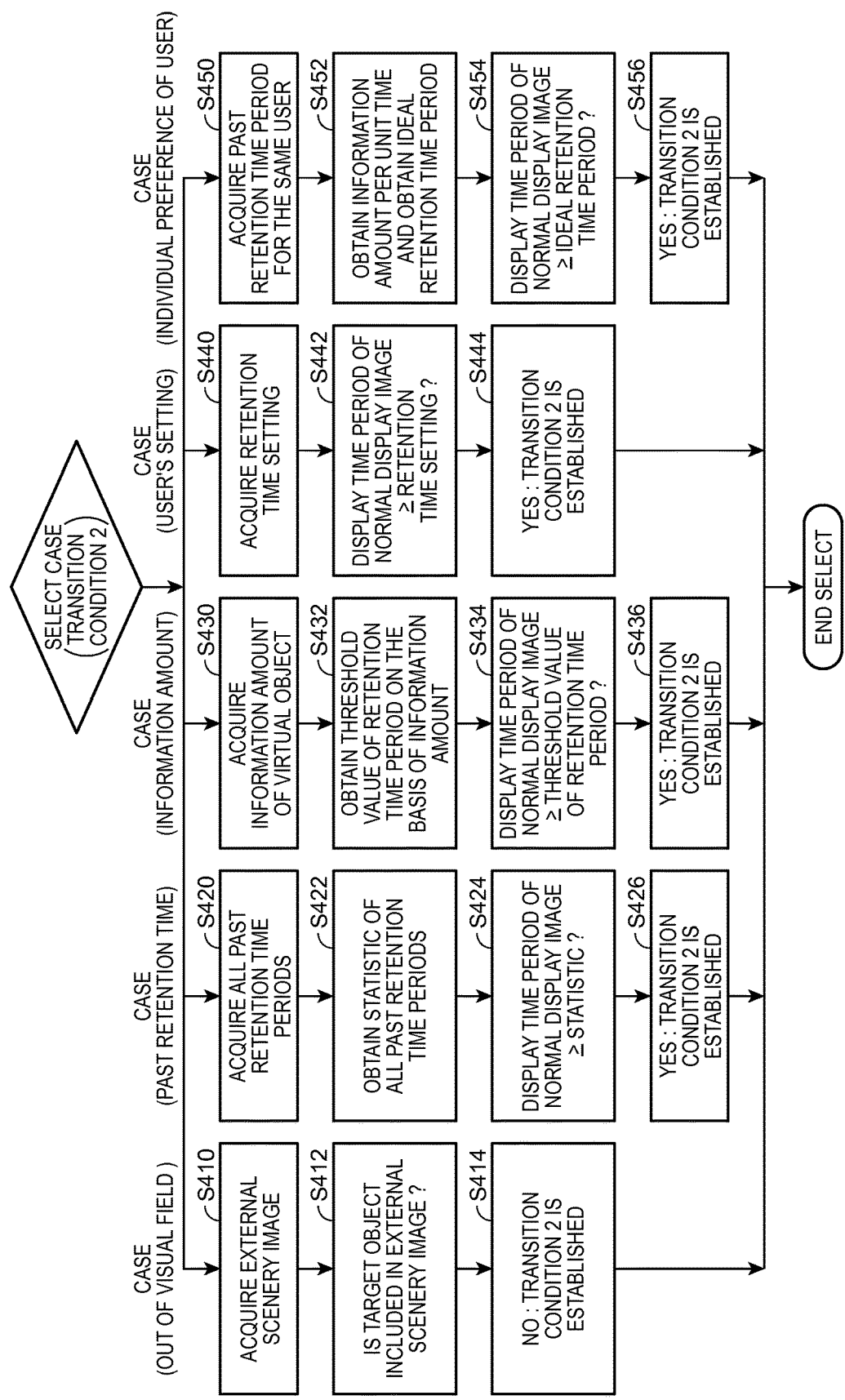
FIG. 13 is a flowchart illustrating procedures of monitoring the establishment of a transition condition 2.

FIG. 13 is a flowchart illustrating procedures of monitoring the establishment of the transition condition 2. Among at least one of conditions 2-1 to 2-5 listed below is set in the augmented reality processing unit 142 in advance as the transition condition 2. The augmented reality processing unit 142 determines that the transition condition 2 is established in a case where any one of the set conditions 2-1 to 2-5 is established.

(2-1) In a case where a real object which is a display target of a virtual object comes out of a visual field of the user (2-2) In a case where time which is equal to or greater than a statistic of a retention time period in the past augmented reality processes has elapsed after a virtual object in the first display aspect is displayed (2-3) In a case where time which is equal to or greater than a time period obtained from an information amount of a virtual object has elapsed after the virtual object in the first display aspect is displayed (2-4) In a case where time which is equal to or greater than a value set by the user has elapsed after a virtual object in the first display aspect is displayed (2-5) In a case where time which is equal to or greater than a time period obtained by taking into consideration an individual preference of the user and an information amount of a virtual object has elapsed after the virtual object in the first display aspect is displayed Then, with reference to FIG. 13, a description will be made of specific procedures for determining establishment of the conditions 2-1 to 2-5 in the augmented reality processing unit 142.

(2-1) CASE (Out of Visual Field): In a Case where a Real Object which is a Display Target of a Virtual Object Comes Out of a Visual Field of the User In step S410, the augmented reality processing unit 142 acquires an external scenery image by using the cameras 61. In step S412, the augmented reality processing unit 142 performs image recognition on the acquired external scenery image so as to determine whether or not a real object for a virtual object which is being displayed in the first display aspect on the external scenery image is included in the external scenery image. The "real object which is a display target of a virtual object" is a "target object" in the simple display process (FIG. 7).

If the target object is not included therein (step S412: NO), the augmented reality processing unit 142 determines that the transition condition 2 is established in step S414. If the target object is included therein, the augmented reality processing unit 142 continues to monitor establishment of the conditions 2-1 to 2-5.

As mentioned above, if the condition 2-1 is used, the augmented reality processing unit 142 can determine that the transition condition 2 is established in a case where a real object for a virtual object which is displayed in the first display aspect comes out of a visual field of the user, and can cause a state (FIG. 4) of the augmented reality process to transition from the normal display state ST1 to the simple display state ST2. As a result, the simple display process (FIG. 7) is performed by the simple display processing portion 146, and the HMD 100 allows the user to visually recognize a virtual image VI (FIGS. 8, 9, 10 and 11) including a virtual object in the second display aspect.

(2-2) CASE (Past Retention Time): In a Case where Time which is Equal to or Greater than a Statistic of a Retention Time Period in the Past Augmented Reality Process has Elapsed after a Virtual Object in the First Display Aspect is Displayed In step S420, the augmented reality processing unit 142 acquires not only history of a retention time period (hereinafter, also referred to as a "past retention time period") used in the past augmented reality process, stored in the past retention time 122 but also history associated with other users. In step S420, the augmented reality processing unit 142 functions as a "retention time acquisition unit", and the past retention time 122 functions as "retention time information".

In step S422, the augmented reality processing unit 142 obtains a statistic of the past retention time periods by using the acquired history. The statistic may be obtained by using any statistical method, and may be, for example, an average value, a mode, or a median. The augmented reality processing unit 142 sets the obtained statistic as a "retention time period used in the present process".

In step S424, the augmented reality processing unit 142 determines whether or not a display time period of the normal display image NI (FIG. 6) of which measurement is started in step S114 of FIG. 5 is equal to or longer than the retention time period (the statistic in step S422) used in the present process. The display time period of the normal display image NI (FIG. 6) is a display time period of a virtual object in the first display aspect.

If the display time period is equal to or greater than the statistic (step S424: YES), in step S426, the augmented reality processing unit 142 determines that the transition condition 2 is established. If the display time period is less than the statistic, the augmented reality processing unit 142 continues to monitor establishment of the conditions 2-1 to 2-5.

As mentioned above, if the condition 2-2 is used, the augmented reality processing unit 142 can automatically change a retention time period used in the present augmented reality process on the basis of a statistic of a retention time period (past retention time period) used in the past augmented reality process, that is, a tendency of the past retention time period. In a case where a display time period of the normal display image NI (a display time period of the virtual objects VO1 to VO3 in the first display aspect) is equal to or longer than a retention time period used in the present augmented reality process, the augmented reality processing unit 142 determines that the transition condition 2 is established and can thus cause a state (FIG. 4) of the augmented reality process to transition from the normal display state ST1 to the simple display state ST2.

(2-3) CASE (Information Amount): In a Case where Time which is Equal to or Greater than a Time Period Obtained from an Information Amount of a Virtual Object has Elapsed after the Virtual Object in the First Display Aspect is Displayed In step S430, the augmented reality processing unit 142 acquires an information amount of a virtual object which is being displayed in the first display aspect. A method of acquiring an information amount of a virtual object is the same as the methods c1 to c3 in step S332 of FIG. 12.

In step S432, the augmented reality processing unit 142 obtains a threshold value of a retention time period used in the present process on the basis of the information amount of the virtual object acquired in step S430. The threshold value may be obtained by using any method, and, for example, a value obtained by multiplying an information amount by a predetermined coefficient (a coefficient which is different from the coefficient in step S334 of FIG. 12) may be used as the threshold value, and the threshold value may be obtained by using a table (a table which is different from the table in step S334 of FIG. 12) in which information amount candidates are correlated with threshold value candidates. The augmented reality processing unit 142 sets the obtained threshold value as a "retention time period used in the present process".

In step S434, the augmented reality processing unit 142 determines whether or not a display time period of the normal display image NI (FIG. 6) of which measurement is started in step S114 of FIG. 5 is equal to or longer than the retention time period (the threshold value in step S432) used in the present process.

If the display time period is equal to or greater than the threshold value (step S434: YES), in step S436, the augmented reality processing unit 142 determines that the transition condition 2 is established. If the display time period is smaller than the threshold value, the augmented reality processing unit 142 continues to monitor establishment of the conditions 2-1 to 2-5.

As mentioned above, if the condition 2-3 is used, the augmented reality processing unit 142 can change a retention time period used in the present augmented reality process on the basis of an information amount of a virtual object (VO1 to VO3 in FIG. 6) in the first display aspect, which occupies a large area in a virtual image VI (a degree of the visibility hindrance is high). In the above-described way, for example, the augmented reality processing unit 142 can make a retention time period in a case where an information amount of a virtual object in the first display aspect is large, in other words, it is estimated that the user requires much time to understand content of a virtual object longer than a retention time period in a case where an information amount is small, and thus it is possible to improve a user's convenience. In addition, in a case where a display time period of a virtual object in the first display aspect is equal to or longer than a retention time period used in the present augmented reality process, the augmented reality processing unit 142 determines that the transition condition 2 is established, and can thus cause a state (FIG. 4) of the augmented reality process to transition from the normal display state ST1 to the simple display state ST2.

(2-4) CASE (User's Setting): In a Case where Time which is Equal to or Greater than a Value Set by the User has Elapsed after a Virtual Object in the First Display Aspect is Displayed In step S440, the augmented reality processing unit 142 acquires a set value of a retention time period which is set by the user, and stored in the retention time setting 123. The augmented reality processing unit 142 functions as a "retention time acquisition unit" in step S440. The augmented reality processing unit 142 sets the acquired set value as a "retention time period used in the present process".

In step S442, the augmented reality processing unit 142 determines whether or not a display time period of the normal display image NI (FIG. 6) of which measurement is started in step S114 of FIG. 5 is equal to or longer than the retention time period (the set value in step S440) used in the present process.

If the display time period is equal to or greater than the set value (step S442: YES), in step S444, the augmented reality processing unit 142 determines that the transition condition 2 is established. If the display time period is smaller than the threshold value, the augmented reality processing unit 142 continues to monitor establishment of the conditions 2-1 to 2-5.

As mentioned above, if the condition 2-4 is used, the augmented reality processing unit 142 can change a retention time period used in the present augmented reality process on the basis of a set value which is preferred by the user and is stored in the retention time setting 123. In addition, in a case where a display time period of a virtual object in the first display aspect is equal to or longer than a retention time period used in the present augmented reality process, the augmented reality processing unit 142 determines that the transition condition 2 is established, and can thus cause a state (FIG. 4) of the augmented reality process to transition from the normal display state ST1 to the simple display state ST2.

(2-5) CASE (Individual Preference of the User): In a Case where Time which is Equal to or Greater than a Time Period Obtained by Taking into Consideration an Individual Preference of the User and an Information Amount of a Virtual Object has Elapsed after the Virtual Object in the First Display Aspect is Displayed In step S450, the augmented reality processing unit 142 acquires history associated with the present user of the HMD 100 on the basis of history of a retention time period used in the past augmented reality process, stored in the past retention time 122. The augmented reality processing unit 142 may search the past retention time 122 with an identifier of the user as a key. The augmented reality processing unit 142 functions as a "retention time acquisition unit" in step S450, and the past retention time 122 functions as "retention time information".

In step S452, the augmented reality processing unit 142 obtains an information amount in which the user of the HMD 100 can perform recognition per unit time by dividing an "information amount" of the acquired history by the "retention time period". Next, the augmented reality processing unit 142 obtains an ideal retention time period by dividing an information amount of a virtual object in the first display aspect by the obtained information amount (the information amount in which the user can perform recognition per unit time). The augmented reality processing unit 142 sets the obtained ideal retention time period as a "retention time period used in the present process". A method of obtaining an information amount of a virtual object is the same as the methods c1 to c3 in step S332 of FIG. 12.

In step S454, the augmented reality processing unit 142 determines whether or not a display time period of the normal display image NI (FIG. 6) of which measurement is started in step S114 of FIG. 5 is equal to or longer than the retention time period (the ideal retention time period in step S452) used in the present process.

If the display time period is equal to or greater than the ideal retention time period (step S454: YES), in step S456, the augmented reality processing unit 142 determines that the transition condition 2 is established. If the display time period is smaller than the ideal retention time period, the augmented reality processing unit 142 continues to monitor establishment of the conditions 2-1 to 2-5.

As mentioned above, if the condition 2-5 is used, the augmented reality processing unit 142 can obtain an information amount in which the user can perform recognition per unit time by using the retention time information (the past retention time 122). For this reason, the augmented reality processing unit 142 can change a retention time period used in the present augmented reality process on the basis of, for example, the obtained information amount (an information amount in which the user can perform recognition per unit time) and an information amount of a virtual object (VO1 to VO3 in FIG. 6) in the first display aspect. In the above-described way, the augmented reality processing unit 142 can make a retention time period in a case where an information amount in which the user can perform recognition per unit time is small, in other words, it is estimated that the user requires much time to understand content of a virtual object in the first display aspect longer than a retention time period in a case where an information amount is large. As a result, the augmented reality processing unit 142 can change a retention time period according to an individual preference of the user, and thus it is possible to improve a user's convenience. In addition, in a case where a display time period of a virtual object in the first display aspect is equal to or longer than a retention time period used in the present augmented reality process, the augmented reality processing unit 142 determines that the transition condition 2 is established, and can thus cause a state (FIG. 4) of the augmented reality process to transition from the normal display state ST1 to the simple display state ST2.

As described above, according to the augmented reality process (transition from the normal display state ST1 to the simple display state ST2 due to establishment of the transition condition 2), the augmented reality processing unit 142 causes the image display section 20 to form the virtual image VI (NI) including the virtual objects (VO1 to VO3 in FIG. 6) in the first display aspect, and then causes the image display section 20 to form the virtual image VI (SI) including the virtual objects (VO4 to VO6 in FIGS. 8, 9, 10 and 11) in the second display aspect, having a smaller occupied area (a low degree of the visibility hindrance) in the virtual image than an area of the virtual objects in the first display aspect after a predetermined retention time period has elapsed. In the above-described way, since an area occupied by the virtual object in the displayed virtual image is automatically reduced (a degree of the visibility hindrance is reduced) after the retention time period has elapsed, it becomes easier for the user to visually recognize a real object which actually exists in the real world. As a result, it is possible to provide a head mounted display (the HMD 100) in which display of a virtual object is unlikely to hinder visual recognition of a real object or the background thereof.

In addition, according to the augmented reality process (monitoring of establishment of the transition condition 2), the augmented reality processing unit 142 can change a retention time period for switching a display aspect from the first display aspect (FIG. 6) in which an area occupied by the virtual objects VO1 to VO3 in the virtual image VI is large (a degree of the visibility hindrance is high) to the second display aspect (FIGS. 8, 9, 10 and 11) in which an area occupied by the virtual objects VO4 to VO6 in the virtual image VI is small (a degree of the visibility hindrance is low), for example, depending on various conditions as listed in the conditions 2-2 to 2-5.

B. Modification Examples

In the above-described embodiments, some of the constituent elements realized in hardware may be realized in software, and, conversely, some of the constituent elements realized in software may be realized in hardware. In addition, the following modifications may also occur.

Modification Example 1

In the above-described embodiment, a configuration of the HMD has been exemplified. However, any configuration of the HMD may be defined within the scope without departing from the spirit of the invention, and, for example, each configuration unit may be added, deleted, changed, or the like.

In the above-described embodiment, the allocation of the constituent elements to the control section and the image display section are only an example, and may employ various aspects. For example, the following aspects may be employed: (i) an aspect in which a processing function such as a CPU and a memory is mounted in the control section, and only a display function is mounted in the image display section; (ii) an aspect in which a processing function such as a CPU and a memory is mounted in both the control section and the image display section; (iii) an aspect in which the control section and the image display section are integrally formed (for example, an aspect in which the image display section includes the control section and functions as a wearable computer); (iv) an aspect in which a smartphone or a portable game machine is used instead of the control section; and (v) an aspect in which the control section and the image display section are coupled to each other via a wireless signal transmission path such as a wireless LAN, infrared communication, or Bluetooth (registered trademark) so that the coupling unit (cords) is removed. In this case, the control section or the image display section may be supplied with power in a wireless manner.

For example, configurations of the control section and the image display section described in the embodiments may be arbitrarily changed. Specifically, in the above-described embodiment, the control section is provided with the transmission unit, and the image display section is provided with the reception unit. However, both of the transmission unit and the reception unit have a bidirectional communication function, and thus can function as a transmission and reception unit. For example, some of the operation interfaces (the various keys, the track pad, and the like) included in the control section may be omitted. The control section may be provided with other operation interfaces such as an operation stick. The control section may be configured to be coupled to devices such as a keyboard or a mouse, and may receive input from the keyboard or the mouse. For example, a secondary battery is used as the power supply, but the power supply is not limited to the secondary battery and may use various batteries. For example, a primary battery, a fuel cell, a solar cell, and a thermal cell may be used.

Figure 14A:
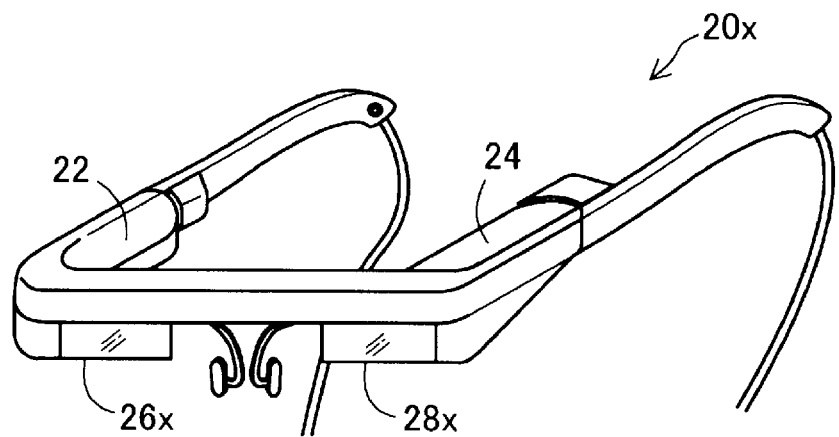
FIGS. 14A and 14B are diagrams illustrating exterior configurations of head mounted displays in modification examples.
Figure 14B:
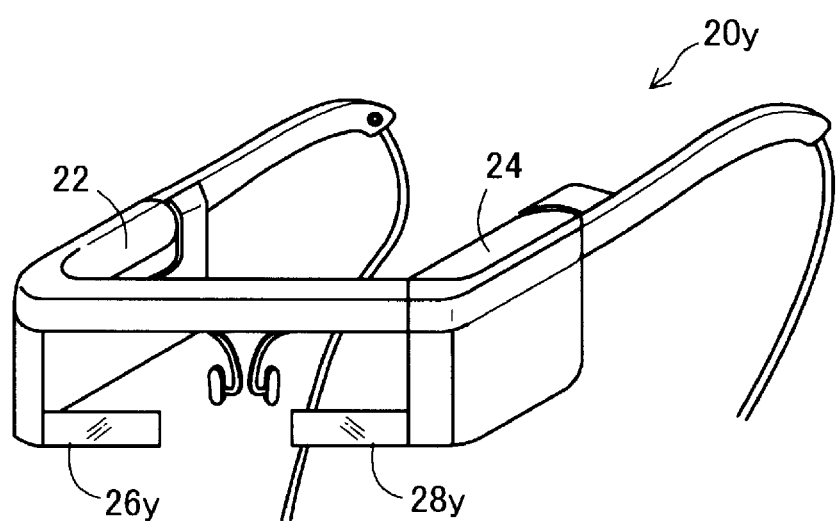

FIGS. 14A and 14B are diagrams illustrating exterior configurations of HMDs in a modification example. In an example of FIG. 14A, an image display section 20x includes a right optical image display unit 26x instead of the right optical image display unit 26 and a left optical image display unit 28x instead of the left optical image display unit 28. The right optical image display unit 26x and the left optical image display unit 28x are formed to be smaller than the optical members of the above-described embodiment, and are disposed on the oblique upper side of the right eye and the left eye of the user when the HMD is mounted. In an example of FIG. 14B, an image display section 20y includes a right optical image display unit 26y instead of the right optical image display unit 26 and a left optical image display unit 28y instead of the left optical image display unit 28. The right optical image display unit 26y and the left optical image display unit 28y are formed to be smaller than the optical members of the above-described embodiment, and are disposed on the oblique lower side of the right eye and the left eye of the user when the HMD is mounted. As mentioned above, the optical image display units have only to be disposed near the eyes of the user. Any size of the optical member forming the optical image display units may be used, and the HMD may be implemented in an aspect in which the optical image display units cover only part of the eyes of the user; in other words, the optical image display units do not completely cover the eyes of the user.

For example, a description has been made that the respective processing units (the image processing unit, the display control unit, the augmented reality processing unit, and the like) included in the control section are realized by the CPU developing a computer program stored in the ROM or the hard disk on the RAM and executing the program. However, these function units may be configured using an application specific integrated circuit (ASIC) which is designed for realizing each of the corresponding functions. Each processing unit may be disposed not in the control section but in the image display section.

For example, the HMD is a binocular transmission type HMD, but may be a monocular HMD. The HMD may be a non-transmissive HMD through which external scenery is blocked from being transmitted in a state in which the user wears the HMD, and may be configured as a video see-through type in which a camera is mounted on the non-transmissive HMD. As an image display section, instead of the image display section which is worn such as spectacles, a typical flat display device (a liquid crystal display, a plasma display panel, an organic EL display, or the like) may be used. Also in this case, coupling between the control section and the image display section may be performed via a wired signal transmission path, and may be performed via a wireless signal transmission path. In the above-described manner, the control section may used as a remote controller of a typical flat display device. In addition, as an image display section, instead of the image display section which is worn such as spectacles, other types of image display sections such as an image display section which is worn such as a cap, may be employed. The earphone may employ an ear-mounted type or a head band type, or may be omitted. For example, a head-up display (HUD) may be configured to be mounted in a vehicle such as an automobile or an airplane, and other transportation. For example, the HMD may be configured to be built into a body protection tool such as a helmet.

For example, in the above-described embodiment, the image light generation unit is configured using the backlight, the backlight control portion, the LCD, the LCD control portion. However, the above aspect is only an example. The image light generation unit may include a configuration unit for realizing other types along with this configuration unit or instead of this configuration unit. For example, the image light generation unit may include an organic electroluminescence (EL) display and an organic EL controller. For example, the image light generation unit may use a digital micromirror device or the like instead of the LCD. For example, the invention is applicable to a laser retinal projective head mounted display.

Modification Example 2

In the above-described embodiment, an example of the augmented reality process has been described. However, the procedures of the process described in the embodiment are only an example, and various modifications may occur. For example, some steps may be omitted, and other steps may be added. In addition, an order of executed steps may be changed.

For example, although the augmented reality process is started from the normal display state ST1 (that is, transition from an initial state to the normal display state ST1), the augmented reality process may be started from the simple display state ST2 (that is, transition from an initial state to the simple display state ST2).

For example, the augmented reality processing unit may also monitor an invalidation action in the same manner as in the transition conditions 2 and 3 during monitoring of the transition condition 1, so as to stop state transition. For example, the augmented reality processing unit may omit monitoring of an invalidation action during monitoring of the transition conditions 2 and 3.

For example, the augmented reality processing unit may monitor a "focusing operation" realized by a motion of the user's head acquired by the nine-axis sensor during monitoring of the transition conditions 1 and 3, instead of the visual line acquisition unit (which acquires a motion of a visual line) or the motion acquisition unit (which acquires a motion of the hand) described in the embodiment, or along with the visual line acquisition unit or the motion acquisition unit.

For example, in the normal display process (FIG. 5), the normal display processing portion may also display a virtual object for a real object (hereinafter, referred to as "another real object") which is not a target of a focusing operation of the user among a plurality of real objects included in an external scenery image when the transition condition 1 or the transition condition 3 is established. The normal display processing portion may change a display aspect of a virtual object added to another real object and a display aspect of a virtual object added to a real object (that is, a target object) which is a target of the focusing operation to each other. The display aspect is, for example, size, brightness, or color saturation.

For example, a forced transition action (second request) for forcing the augmented reality process to transition may be used instead of the above-described invalidation action (first request) or along with the invalidation action. The forced transition action is an operation performed by using at least one of the hand, the foot, a sound and the head of the user, and a combination thereof, and may employ any operation as long as the operation is different from the invalidation action. In a case where the forced transition action is detected when the augmented reality process is in the normal display state ST1, the augmented reality processing unit causes the augmented reality process to transition to the simple display state ST2. In the above-described manner, the augmented reality processing unit can force a display aspect of the augmented reality process to transition from the first display aspect to the second display aspect even before a retention time period has elapsed in response to the second request from the user, and thus it is possible to improve a user's convenience. On the other hand, in a case where the forced transition action is detected when the augmented reality process is in the simple display state ST2, the augmented reality processing unit causes the augmented reality process to transition to the normal display state ST1. In the above-described manner, the augmented reality processing unit can display a virtual object in the first display aspect in response to the second request from the user even before a reference time period has elapsed, and thus it is possible to improve a user's convenience.

Modification Example 3

If e1 to e8 described below are performed on the augmented reality process exemplified in the embodiment, it is possible to realize work support using the HMD.

(e1) Information related to work (including, for example, an instruction for work content, information for assisting the instruction for work content, standard time required in work, and information for specifying a motion of the user during work) is stored in the storage unit in advance.

(e2) A motion of the user's body is acquired by using the nine-axis sensor and the cameras (the nine-axis sensor and the cameras may be used alone or together with each other; and other sensors may also be used).

(e3) After work support is started, a progress condition of the work performed by the user is monitored by combining the information related to the work (the standard time required in the work, and the information for specifying a motion of the user during the work) stored in the storage unit with the motion of the user's body acquired in the modification e2.

(e4) In a case where a monitoring result of the modification e3 indicates either "work stoppage" in which a motion of the user's body stops or "work delay" in which progress is delayed by a predetermined time, it is determined that the transition condition 1 (a transition condition from an initial state to the normal display state ST1) of the augmented reality process is established, and a virtual object in the first display aspect is displayed. The displayed virtual object is information based on the information related to the work (the instruction for work content and the information for assisting the instruction for work content) stored in the storage unit.

(e5) In a case where a monitoring result of the modification e3 indicates "during work" in which progress is performed as scheduled in the normal display state ST1, it is determined that the transition condition 2 (a transition condition from the normal display state ST1 to the simple display state ST2) of the augmented reality process is established, and a virtual object in the second display aspect is displayed. The virtual object in the second display aspect may not be displayed, and may be displayed by using an icon image, text, or the like, as described above.

(e6) In a case where a monitoring result of the modification e3 indicates the work stoppage or the work delay in the normal display state ST1, the normal display state ST1 is retained.

(e7) In a case where a monitoring result of the modification e3 indicates the work stoppage or the work delay in the simple display state ST2, it is determined that the transition condition 3 (a transition condition from the simple display state ST2 to the normal display state ST1) of the augmented reality process is established, and a virtual object in the first display aspect is displayed.

(e8) In a case where a monitoring result of the modification e3 indicates during work in the simple display state ST2, the simple display state ST2 is retained.

In the above-described manner, the HMD can cause the simple display state ST2 (including display and non-display of a virtual object in the second display aspect) to be retained in a case of a skilled worker who can perform smooth work and can cause the normal display state ST1 (display of a virtual object in the first display aspect) to be retained in a case of an unskilled worker unaccustomed to the work. Even in a case of the skilled worker, when the work is stopped due to the occurrence of unclarity in the middle of procedures, transition to the normal display state ST1 may occur, and a virtual object in the first display aspect may be displayed. As a result, it is possible to provide an HMD which can perform work support in which a worker's convenience is improved. As a result, in a case where a virtual object may not be required to be displayed, such as a case where a skilled worker is a user of the HMD, display of the virtual object may be omitted (or simplified). For this reason, it is possible to reduce a possibility that the visibility of a real object may unnecessarily deteriorate and thus to reduce concern that the user may experience inconvenience.

As described above, in Modification Example 3, in a case where a predetermined operation (information for specifying a motion of the user during work) is not started by the user (worker) within a predetermined reference time period (the standard time required in the work), the augmented reality processing unit causes the image display section to form a virtual image including a virtual object in the first display aspect. In other words, in a case where the predetermined operation is started by the user within the reference time period, the augmented reality processing unit does not display the virtual object in the first display aspect. For this reason, for example, in a case where the user performs a predetermined operation (for example, certain work), it is possible to reduce a possibility that a virtual object in the first display aspect may be displayed and may shield a user's field of vision. As a result, it is possible to provide a head mounted display (HMD) in which display of a virtual object is unlikely to hinder visual recognition of a real object or the background thereof.

Also in Modification Example 3, in the same manner as in the embodiment, transition between the normal display state ST1 and the simple display state ST2 may be performed when a focusing operation is continuously performed during a predetermined reference time period. In the above-described way, in a case where a worker who performs a series of work items is at a loss since the worker has no idea of the next operation, it is possible to perform work support through state transition from the simple display state ST2 to the normal display state ST1.

In the above description that "the image display section forms a virtual image including a virtual object in the first display aspect in a case where a predetermined operation is not started by the user within a predetermined reference time period", this matches the content of the embodiment if the "predetermined operation" is replaced with an "operation for stopping a continuous focusing operation".

Modification Example 4

The invention is not limited to the above-described embodiment or modification examples, and may be implemented using various configurations within the scope without departing from the spirit thereof. For example, the embodiment corresponding to technical features of the respective aspects described in the Summary of Invention and the technical features in the modification examples may be exchanged or combined as appropriate in order to solve some or all of the above-described problems, or in order to achieve some or all of the above-described effects. In addition, if the technical feature is not described as an essential feature in the present specification, the technical feature may be deleted as appropriate.

The entire disclosure of Japanese Patent Application Nos. 2014-212725, filed Oct. 17, 2014 and 2014-212728, filed Oct. 17, 2014 are expressly incorporated by reference herein.

What is claimed is:

1. A head mounted display which allows a user to visually recognize a virtual image, comprising:
  an image display unit that enables the user to visually recognize the virtual image; and
  a processor functioning as an augmented reality processing unit that causes the image display unit to form the virtual image including a virtual object which is displayed additionally to a real object actually existing in the real world,
  wherein the augmented reality processing unit causes the virtual image including the virtual object in a first display aspect to be formed, and then causes the virtual image including the virtual object in a second display aspect to be formed solely in response to the elapse of a predetermined retention time period without a change in location of the head mounted display,
  wherein a degree of the visibility hindrance of the virtual object in the second display aspect for the real object is lower than a degree of the visibility hindrance of the virtual object in the first display aspect for the real object,
  wherein the retention time period has a variable length,
  wherein the processor further functions as a retention time acquisition unit that acquires the retention time period used in the augmented reality processing unit in the past, and
  wherein the augmented reality processing unit obtains a statistic of the acquired past retention time period, and changes the retention time period used in the present process on the basis of the obtained statistic.

2. A head mounted display which allows a user to visually recognize a virtual image, comprising:
an image display unit that enables the user to visually recognize the virtual image; and
a processor functioning as an augmented reality processing unit that causes the image display unit to form the virtual image including a virtual object which is displayed additionally to a real object actually existing in the real world,
wherein the augmented reality processing unit causes the virtual image including the virtual object in a first display aspect to be formed, and then causes the virtual image including the virtual object in a second display aspect to be formed solely in response to the elapse of a predetermined retention time period without a change in location of the head mounted display,
wherein a degree of the visibility hindrance of the virtual object in the second display aspect for the real object is lower than a degree of the visibility hindrance of the virtual object in the first display aspect for the real object,
wherein the retention time period has a variable length, and
wherein the augmented reality processing unit obtains an information amount of the virtual object in the first display aspect, and changes the retention time period used in the present process on the basis of the obtained information amount.

3. The head mounted display according to claim 2,
wherein the augmented reality processing unit changes a method of obtaining the information amount depending on the kind of virtual object in the first display aspect.

4. A head mounted display which allows a user to visually recognize a virtual image, comprising:
an image display unit that enables the user to visually recognize the virtual image; and
a processor functioning as an augmented reality processing unit that causes the image display unit to form the virtual image including a virtual object which is displayed additionally to a real object actually existing in the real world,
wherein the augmented reality processing unit causes the virtual image including the virtual object in a first display aspect to be formed, and then causes the virtual image including the virtual object in a second display aspect to be formed solely in response to the elapse of a predetermined retention time period without a change in location of the head mounted display,
wherein a degree of the visibility hindrance of the virtual object in the second display aspect for the real object is lower than a degree of the visibility hindrance of the virtual object in the first display aspect for the real object,
wherein the retention time period has a variable length,
wherein the processor further functions as a retention time acquisition unit that acquires retention time information in which the retention time period used in the past in the augmented reality processing unit, an information amount of the virtual object in the first display aspect at that time, and identification information for identifying the user are correlated with each other, and
wherein the augmented reality processing unit changes the retention time period used in the present process on the basis of the acquired retention time information and the information amount of the virtual object in the first display aspect.

5. A head mounted display which allows a user to visually recognize a virtual image, comprising:
an image display unit that enables the user to visually recognize the virtual image; and
a processor functioning as an augmented reality processing unit that causes the image display unit to form the virtual image including a virtual object which is displayed additionally to a real object actually existing in the real world,
wherein the augmented reality processing unit causes the virtual image including the virtual object in a first display aspect to be formed, and then causes the virtual image including the virtual object in a second display aspect to be formed solely in response to the elapse of a predetermined retention time period without a change in location of the head mounted display,
wherein a degree of the visibility hindrance of the virtual object in the second display aspect for the real object is lower than a degree of the visibility hindrance of the virtual object in the first display aspect for the real object, and
wherein the augmented reality processing unit stops transition from the first display aspect to the second display aspect when a first request is acquired from the user while waiting for the retention time period to elapse.

6. A head mounted display which allows a user to visually recognize a virtual image, comprising:
an image display unit that enables the user to visually recognize the virtual image; and
a processor functioning as an augmented reality processing unit that causes the image display unit to form the virtual image including a virtual object which is displayed additionally to a real object actually existing in the real world,
wherein the augmented reality processing unit causes the virtual image including the virtual object in a first display aspect to be formed, and then causes the virtual image including the virtual object in a second display aspect to be formed solely in response to the elapse of a predetermined retention time period without a change in location of the head mounted display,
wherein a degree of the visibility hindrance of the virtual object in the second display aspect for the real object is lower than a degree of the visibility hindrance of the virtual object in the first display aspect for the real object, and
wherein the augmented reality processing unit allows transition from the first display aspect to the second display aspect even before the retention time period has elapsed when a second request is acquired from the user while waiting for the retention time period to elapse.

7. The head mounted display according to claim 5,
wherein the processor further functions as a request acquisition unit that acquires a request realized by at least one of the hand, the foot, a sound and the head of the user, and a combination thereof, as the first request or the second request.

8. A head mounted display which allows a user to visually recognize a virtual image and external scenery, comprising:
an image display unit that enables the user to visually recognize the virtual image; and
a processor functioning as an augmented reality processing unit that causes the image display unit to form the virtual image including a virtual object which is displayed additionally to a real object actually existing in the real world, wherein, in response to a continuous focusing operation on the real object for a time period which is equal to or greater than a statistic of a reference time period in a past augmented reality process during a predetermined reference time period, the augmented reality processing unit causes the virtual image including the virtual object in a first display aspect to be formed, the virtual object being related to the real object on which at least the focusing operation is performed.

9. A head mounted display which allows a user to visually recognize a virtual image and external scenery, comprising:

an image display unit that enables the user to visually recognize the virtual image; and a processor functioning as an augmented reality processing unit that causes the image display unit to form the virtual image including a virtual object which is displayed additionally to a real object actually existing in the real world, wherein, when the virtual image including the virtual object in a second display aspect is being displayed, the augmented reality processing unit causes the virtual image including the virtual object in a first display aspect to be formed in response to a continuous focusing operation on either the virtual object in the second display aspect or the real object for a time period which is equal to or greater than a statistic of a reference time period in a past augmented reality process, the virtual object being related to the real object on which at least the focusing operation is performed, and wherein a degree of the visibility hindrance of the virtual object in the second display aspect for the real object is lower than a degree of the visibility hindrance of the virtual object in the first display aspect for the real object.

10. The head mounted display according to claim 8, wherein the processor further functions as a visual line acquisition unit that acquires a motion of a visual line of the user as the focusing operation.

11. The head mounted display according to claim 8, wherein the processor further functions as a motion acquisition unit that acquires a motion of the hand of the user as the focusing operation.

12. The head mounted display according to claim 8, wherein the reference time period has a variable length.

13. The head mounted display according to claim 12, wherein the processor further functions as a reference time acquisition unit that acquires the reference time period used in the augmented reality processing unit in the past, and wherein the augmented reality processing unit obtains a statistic of the acquired past reference time period, and changes the reference time period used in the present process on the basis of the obtained statistic.

14. The head mounted display according to claim 12, wherein the augmented reality processing unit obtains an information amount of the virtual object in the first display aspect, and changes the reference time period used in the present process on the basis of the obtained information amount.

15. The head mounted display according to claim 14, wherein the augmented reality processing unit changes a method of obtaining the information amount depending on the kind of virtual object in the first display aspect.

16. The head mounted display according to claim 12, wherein the processor further functions as a reference time acquisition unit that acquires a user's setting performed on the reference time period, and wherein the augmented reality processing unit changes the reference time period used in the present process on the basis of the acquired user's setting.

17. The head mounted display according to claim 12, wherein the processor further functions as a reference time acquisition unit that acquires reference time information in which the reference time period used in the past in the augmented reality processing unit, an information amount of the virtual object in the first display aspect at that time, and identification information for identifying the user are correlated with each other, and wherein the augmented reality processing unit changes the reference time period used in the present process on the basis of the acquired reference time information and the information amount of the virtual object in the first display aspect.

18. The head mounted display according to claim 9, wherein the virtual object in the second display aspect includes at least one of text, a graphic, a pattern, a symbol, and a combination thereof, suggesting content of the virtual object in the first display aspect.

19. The head mounted display according to claim 8, wherein the augmented reality processing unit stops transition to the first display aspect when a first request is acquired from the user while waiting for the reference time period to elapse.

20. The head mounted display according to claim 8, wherein the augmented reality processing unit causes the virtual image including the virtual object in the first display aspect to be formed even before the reference time period has elapsed when a second request is acquired from the user while waiting for the reference time period to elapse.

21. The head mounted display according to claim 19, wherein the processor further functions as a request acquisition unit that acquires a request realized by at least one of the hand, the foot, a sound and the head of the user, and a combination thereof, as the first request or the second request.

\* \* \* \* \*